US010519070B2

(12) United States Patent
Sanders

(10) Patent No.: US 10,519,070 B2
(45) Date of Patent: Dec. 31, 2019

(54) POLYMER SOIL TREATMENT COMPOSITIONS INCLUDING HUMIC ACIDS

(71) Applicant: Verdesian Life Sciences U.S., LLC, Cary, NC (US)

(72) Inventor: John Larry Sanders, Leawood, KS (US)

(73) Assignee: Verdesian Life Sciences U.S., LLC, Cary, NC (US)

( * ) Notice: Subject to any disclaimer, the term of this patent is extended or adjusted under 35 U.S.C. 154(b) by 0 days.

(21) Appl. No.: 15/312,919

(22) PCT Filed: May 21, 2015

(86) PCT No.: PCT/US2015/032037
§ 371 (c)(1),
(2) Date: Nov. 21, 2016

(87) PCT Pub. No.: WO2015/179687
PCT Pub. Date: Nov. 26, 2015

(65) Prior Publication Data
US 2017/0183272 A1 Jun. 29, 2017

Related U.S. Application Data

(60) Provisional application No. 62/001,376, filed on May 21, 2014.

(51) Int. Cl.
| C05F 11/02 | (2006.01) |
| C05B 17/00 | (2006.01) |
| C05C 9/00 | (2006.01) |
| C05G 3/04 | (2006.01) |

(52) U.S. Cl.
CPC .............. *C05F 11/02* (2013.01); *C05B 17/00* (2013.01); *C05C 9/00* (2013.01); *C05G 3/04* (2013.01)

(58) Field of Classification Search
CPC ... C05F 11/02; C05G 3/04; C05C 9/00; C05B 17/00
See application file for complete search history.

(56) References Cited

U.S. PATENT DOCUMENTS

| 2,618,547 A | 1/1950 | Davenport et al. |
| 2,616,849 A | 11/1952 | Giammaria |
| 2,616,853 A | 11/1952 | Giammaria |
| 2,625,471 A | 1/1953 | Mowry et al. |
| 2,625,529 A | 1/1953 | Hedrick et al. |
| 2,976,138 A | 3/1961 | Hester |
| 3,052,648 A | 9/1962 | Bauer |
| 3,087,893 A | 4/1963 | Agius et al. |
| 3,130,033 A | 4/1964 | Stephens |
| 3,222,282 A | 12/1965 | Berkowitz et al. |
| 3,262,919 A | 7/1966 | Bolgiono |
| 3,308,067 A | 3/1967 | Diehl |
| 3,497,334 A | 2/1970 | Gee et al. |
| 3,634,052 A | 1/1972 | Gee et al. |
| 3,639,242 A | 2/1972 | Le Suer |
| 3,685,998 A | 8/1972 | Miller |
| 3,720,765 A | 3/1973 | Miller |
| 3,796,559 A | 3/1974 | Windgassen |
| 3,873,487 A | 3/1975 | Minato et al. |
| 3,936,427 A | 2/1976 | Viout et al. |
| 3,953,191 A | 4/1976 | Barton |
| 3,996,134 A | 12/1976 | Osborn et al. |
| 3,997,319 A | 12/1976 | Ott |
| 4,007,029 A | 2/1977 | Kenton |
| 4,010,006 A | 3/1977 | Price |
| 4,071,400 A | 1/1978 | Jankowiak |
| 4,076,663 A | 2/1978 | Masuda et al. |
| 4,082,533 A | 4/1978 | Wittenbrook et al. |
| 4,083,835 A | 4/1978 | Pohlemann et al. |
| 4,135,887 A | 1/1979 | Rossi |
| 4,161,539 A | 7/1979 | Stallcup |
| 4,165,743 A | 8/1979 | Denning |
| 4,173,669 A | 11/1979 | Ashida et al. |
| 4,211,765 A | 7/1980 | Johnson et al. |
| 4,251,255 A | 2/1981 | Wagner et al. |
| 4,434,231 A | 2/1984 | Jung |
| 4,439,488 A | 3/1984 | Trimnell et al. |
| 4,451,628 A | 5/1984 | Dammann |
| 4,471,100 A | 9/1984 | Tsubakimoto et al. |
| 4,538,532 A | 9/1985 | Coker |
| 4,652,273 A | 3/1987 | Maldonado et al. |

(Continued)

FOREIGN PATENT DOCUMENTS

| CN | 1044025 A | 7/1990 |
| CN | 1149239 A | 5/1997 |

(Continued)

OTHER PUBLICATIONS

Sanders. "Nutrisphere-N (NSN) Polymer: Characteristics & Mode of Action" Fertilizer Industry Round Table (2007) pp. 1-26.*
SFP. NutriSphere-N For Liquid (2006) pp. 1-4.*
Olk, Daniel C. "A chemical fractionation for structure—function relations of soil organic matter in nutrient cycling." Soil Science Society of America Journal 70.3 (2006): 1013-1022.*
Pettit, Robert E. "Organic matter, humus, humate, humic acid, fulvic acid and humin: Their importance in soil fertility and plant health." CTI Research (2004).*
AGROTAIN International LLC White Paper: Maleic-Itaconic Copolymer; available online at talk.newagtalk.com/forums/get-attachment. asp?attachmentid=42697; downloaded Feb. 1, 2017.
AVAIL MSDS dated Jan. 16, 2012.
Aziz, et al. *Efficiency of Slow Release Urea Fertilizer on Herb Yield and Essential Oil Production of Lemon Balm (Melissa Officinalis L.) Plant.* American-Eurasian J. Agric. & Environ. Sci., [Online] 5(2) :141-147, 2009.

(Continued)

*Primary Examiner* — Jennifer A Smith
(74) *Attorney, Agent, or Firm* — Katten Muchin Rosenman LLP

(57) ABSTRACT

Improved, low-cost agricultural products are provided comprising respective amounts of humic acid and a polyanionic polymer. The products may be mixed with or applied to fertilizers to enhance plant uptake of nutrients. The polyanionic polymer preferably includes maleic and itaconic repeat units, and optionally sulfonate repeat units.

19 Claims, No Drawings

(56) References Cited

U.S. PATENT DOCUMENTS

| | | |
|---|---|---|
| 4,663,408 A | 5/1987 | Schulz et al. |
| 4,701,204 A | 10/1987 | Duvdevani et al. |
| 4,709,091 A | 11/1987 | Fukumoto et al. |
| 4,725,655 A | 2/1988 | Denzinger et al. |
| 4,808,215 A | 2/1989 | Gill et al. |
| 4,844,725 A | 7/1989 | Malouf et al. |
| 4,872,412 A | 10/1989 | Zollinger |
| 4,897,220 A | 1/1990 | Trieselt et al. |
| 4,923,500 A | 5/1990 | Sylling |
| 4,929,690 A | 5/1990 | Goertz et al. |
| 4,933,098 A | 6/1990 | Gutierrez et al. |
| 4,936,897 A | 6/1990 | Pipko et al. |
| 4,952,415 A | 8/1990 | Winowiski et al. |
| 5,013,769 A | 5/1991 | Murray et al. |
| 5,024,676 A | 6/1991 | Moriyama et al. |
| 5,035,821 A | 7/1991 | Chung et al. |
| 5,047,078 A | 9/1991 | Gill |
| 5,054,434 A | 10/1991 | Wax et al. |
| 5,064,563 A | 11/1991 | Yamaguchi et al. |
| 5,106,648 A | 4/1992 | Williams |
| 5,113,619 A | 5/1992 | Leps et al. |
| 5,135,677 A | 8/1992 | Yamaguchi et al. |
| 5,188,654 A | 2/1993 | Manalastas et al. |
| 5,194,263 A | 3/1993 | Chamberlain et al. |
| 5,210,163 A | 5/1993 | Grey |
| 5,223,592 A | 6/1993 | Hughes et al. |
| 5,256,181 A | 10/1993 | Manalastas et al. |
| 5,294,651 A | 3/1994 | Stephens |
| 5,300,127 A | 4/1994 | Williams |
| 5,328,624 A | 7/1994 | Chung |
| 5,336,727 A | 8/1994 | Okazawa et al. |
| 5,391,632 A | 2/1995 | Krull et al. |
| 5,399,639 A | 3/1995 | Kimpton et al. |
| 5,427,785 A | 6/1995 | Ronson et al. |
| 5,435,821 A | 7/1995 | Duvdevani et al. |
| 5,536,311 A | 7/1996 | Rodrigues |
| 5,562,916 A | 10/1996 | Van Ooijen |
| 5,574,004 A | 11/1996 | Carr |
| 5,578,486 A | 11/1996 | Zhang |
| 5,597,400 A | 1/1997 | Nonomura et al. |
| 5,653,782 A | 8/1997 | Stern et al. |
| 5,666,905 A | 9/1997 | Mackin et al. |
| 5,681,678 A | 10/1997 | Nealey et al. |
| 5,688,907 A | 11/1997 | Wood et al. |
| 5,697,186 A | 12/1997 | Neyra et al. |
| 5,732,658 A | 3/1998 | Wolters et al. |
| 5,741,521 A | 4/1998 | Knight et al. |
| 5,760,150 A | 6/1998 | Bachus |
| 5,788,722 A | 8/1998 | Emert et al. |
| 5,916,029 A | 6/1999 | Smith et al. |
| 5,993,666 A | 11/1999 | Yamaguchi et al. |
| 5,994,265 A | 11/1999 | Barclay et al. |
| 5,997,602 A | 12/1999 | Aijala |
| 6,022,555 A | 2/2000 | DeLuca et al. |
| 6,057,398 A | 5/2000 | Blum |
| 6,100,221 A | 8/2000 | Poelker et al. |
| 6,100,224 A | 8/2000 | Peiffer et al. |
| 6,139,596 A | 10/2000 | Barth et al. |
| 6,180,589 B1 | 1/2001 | Rodrigues et al. |
| 6,187,074 B1 | 2/2001 | von Locquenghien et al. |
| 6,199,318 B1 | 3/2001 | Stewart et al. |
| 6,207,780 B1 | 3/2001 | Stockhausen et al. |
| 6,221,956 B1 | 4/2001 | Chen |
| 6,228,806 B1 | 5/2001 | Mehta |
| 6,271,191 B1 | 8/2001 | Kerobo et al. |
| 6,287,359 B1 | 9/2001 | Erhardt et al. |
| 6,309,439 B1 | 10/2001 | von Locquenghien et al. |
| 6,312,493 B1 | 11/2001 | Eltink et al. |
| 6,384,166 B1 | 5/2002 | Austin et al. |
| 6,395,051 B1 | 5/2002 | Arnold et al. |
| 6,413,292 B1 | 7/2002 | von Locquengh et al. |
| 6,444,771 B1 | 9/2002 | Yamaguchi et al. |
| 6,471,741 B1 | 10/2002 | Reinbergen |
| 6,488,734 B1 | 12/2002 | Barth et al. |
| 6,500,223 B1 | 12/2002 | Sakai et al. |
| 6,515,090 B1 | 2/2003 | Sanders et al. |
| 6,515,091 B2 | 2/2003 | Sanders et al. |
| 6,544,313 B2 | 4/2003 | Peacock et al. |
| 6,569,976 B2 | 5/2003 | Baxter et al. |
| 6,586,560 B1 | 7/2003 | Chen et al. |
| 6,632,262 B2 | 10/2003 | Gabrielson |
| 6,635,702 B1 | 10/2003 | Schmucker-Castner et al. |
| 6,653,428 B1 | 11/2003 | Klein et al. |
| 6,703,469 B2 | 3/2004 | Sanders et al. |
| 6,734,148 B2 | 5/2004 | Bell et al. |
| 6,770,616 B1 | 8/2004 | McGowan et al. |
| 6,843,846 B2 | 1/2005 | Chatterji et al. |
| 6,844,293 B1 | 1/2005 | Kirby et al. |
| 6,855,182 B2 | 2/2005 | Sears |
| 6,897,184 B2 | 5/2005 | Kurita et al. |
| 6,897,253 B2 | 5/2005 | Schmucker-Castner et al. |
| 6,930,139 B2 | 8/2005 | Sanders et al. |
| 6,936,598 B2 | 8/2005 | Khoo et al. |
| 7,004,991 B2 | 2/2006 | Narayanan et al. |
| 7,019,046 B2 | 3/2006 | Narayanan et al. |
| 7,071,259 B2 | 7/2006 | Botros |
| 7,071,275 B2 | 7/2006 | Rath et al. |
| 7,201,959 B2 | 4/2007 | Judek et al. |
| 7,217,752 B2 | 5/2007 | Schmucker-Castner et al. |
| 7,317,062 B2 | 1/2008 | Pritschins et al. |
| 7,470,304 B2 | 12/2008 | Keenan et al. |
| 7,537,705 B2 | 5/2009 | Mizuno et al. |
| 7,572,328 B2 | 8/2009 | Lettkeman et al. |
| 7,615,521 B2 | 11/2009 | Eveland et al. |
| 7,655,597 B1 | 2/2010 | Sanders |
| 7,666,241 B2 | 2/2010 | Sanders et al. |
| 7,686,863 B1 | 3/2010 | Sanders |
| 7,695,541 B1 | 4/2010 | Frizzell et al. |
| 7,923,479 B2 | 4/2011 | Champ et al. |
| 7,942,941 B2 | 5/2011 | Cravey et al. |
| 8,025,709 B2 | 9/2011 | Sanders et al. |
| 8,043,995 B2 | 10/2011 | Sanders et al. |
| 8,097,076 B2 | 1/2012 | Göbelt et al. |
| 8,110,017 B2 | 2/2012 | Wells |
| 8,143,333 B2 | 3/2012 | Peppmoller et al. |
| 8,163,859 B2 | 4/2012 | Jeon et al. |
| 8,182,593 B2 | 5/2012 | Rapp |
| 8,192,520 B2 | 6/2012 | Sanders |
| 8,420,758 B2 | 4/2013 | Durant et al. |
| 8,430,943 B2 | 4/2013 | Sanders |
| 8,436,072 B2 | 5/2013 | Herth et al. |
| 8,491,693 B2 | 7/2013 | Burnham |
| 8,562,710 B2 | 10/2013 | Palmer et al. |
| 8,592,343 B2 | 11/2013 | Xavier et al. |
| 8,846,817 B2 | 9/2014 | Yontz et al. |
| 9,139,481 B2 | 9/2015 | Sanders |
| 9,145,340 B2 | 9/2015 | Sanders |
| 2001/0002390 A1 | 5/2001 | Rodrigues |
| 2001/0029762 A1 | 10/2001 | Steele et al. |
| 2002/0010296 A1 | 1/2002 | Baxter et al. |
| 2002/0049139 A1 | 4/2002 | Smale |
| 2002/0132886 A1 | 9/2002 | Meffert et al. |
| 2003/0203825 A1 | 10/2003 | Aubay |
| 2003/0225233 A1 | 12/2003 | Dilocker et al. |
| 2004/0202634 A1 | 10/2004 | L'Alloret |
| 2004/0211234 A1 | 10/2004 | Volgas et al. |
| 2004/0226329 A1 | 11/2004 | Sanders et al. |
| 2004/0226330 A1 | 11/2004 | Sanders et al. |
| 2004/0226331 A1 | 11/2004 | Sanders et al. |
| 2004/0230020 A1 | 11/2004 | Sanders et al. |
| 2004/0265266 A1 | 12/2004 | Champ et al. |
| 2004/0266621 A1 | 12/2004 | West |
| 2005/0050931 A1 | 3/2005 | Sanders et al. |
| 2005/0090402 A1 | 4/2005 | Dieing et al. |
| 2005/0158268 A1 | 7/2005 | Schmucker-Castner et al. |
| 2006/0030486 A1 | 2/2006 | Meyer et al. |
| 2006/0069004 A1 | 3/2006 | Song et al. |
| 2006/0078526 A1 | 4/2006 | Boyd et al. |
| 2006/0191851 A1 | 8/2006 | Mizuno et al. |
| 2006/0234901 A1 | 10/2006 | Scheuing et al. |
| 2007/0027281 A1 | 2/2007 | Michl et al. |
| 2007/0161524 A1 | 7/2007 | Counradi et al. |
| 2007/0212320 A1 | 9/2007 | Demitz et al. |
| 2007/0213243 A1 | 9/2007 | Yao et al. |

(56) References Cited

U.S. PATENT DOCUMENTS

| | | |
|---|---|---|
| 2007/0218168 A1 | 9/2007 | Hale, III |
| 2008/0044548 A1 | 2/2008 | Hale, III |
| 2008/0189085 A1 | 8/2008 | Cook et al. |
| 2009/0071213 A1 | 3/2009 | Keenan et al. |
| 2009/0149364 A1 | 6/2009 | Beck |
| 2009/0151755 A1 | 6/2009 | Beck |
| 2009/0163365 A1 | 6/2009 | Bentlage et al. |
| 2009/0227451 A1 | 9/2009 | Rose et al. |
| 2009/0258786 A1 | 10/2009 | Pursell et al. |
| 2009/0270257 A1 | 10/2009 | Pursell et al. |
| 2009/0308122 A1 | 12/2009 | Shah |
| 2010/0012040 A1 | 1/2010 | Pow et al. |
| 2010/0024500 A1 | 2/2010 | Tyler |
| 2010/0099566 A1 | 4/2010 | Bobnock |
| 2010/0120617 A1 | 5/2010 | Dyllick-Brenzinger et al. |
| 2010/0122379 A1 | 5/2010 | Dieckmann et al. |
| 2010/0167975 A1 | 7/2010 | Vandermeulen et al. |
| 2010/0175443 A1 | 7/2010 | Sanders et al. |
| 2010/0203228 A1 | 8/2010 | Funaki et al. |
| 2010/0210802 A1 | 8/2010 | Creamer et al. |
| 2010/0234233 A1 | 9/2010 | Sannino et al. |
| 2010/0234506 A1 | 9/2010 | Elizalde et al. |
| 2010/0298526 A1 | 11/2010 | Tsumori et al. |
| 2011/0042318 A1 | 2/2011 | Painter et al. |
| 2011/0095227 A1 | 4/2011 | Herth et al. |
| 2011/0146136 A1 | 6/2011 | Waterson et al. |
| 2011/0303157 A1 | 12/2011 | Laubenstein |
| 2012/0004383 A1 | 1/2012 | Laubender et al. |
| 2012/0055414 A1 | 3/2012 | Correa |
| 2012/0065071 A1 | 3/2012 | Li et al. |
| 2012/0118575 A1 | 5/2012 | Griffin |
| 2012/0129749 A1 | 5/2012 | Detering et al. |
| 2012/0129750 A1 | 5/2012 | Detering et al. |
| 2012/0220454 A1 | 8/2012 | Chen et al. |
| 2012/0277099 A1 | 11/2012 | Olson et al. |
| 2012/0277133 A1 | 11/2012 | DiBiase et al. |
| 2013/0090240 A1 | 4/2013 | Yamaguchi et al. |
| 2013/0171737 A1 | 7/2013 | Way et al. |
| 2013/0212739 A1 | 8/2013 | Giritch et al. |
| 2014/0106023 A1 | 4/2014 | Sanders |
| 2014/0106024 A1 | 4/2014 | Sanders |
| 2014/0315716 A1 | 10/2014 | Matheny et al. |
| 2014/0342905 A1 | 11/2014 | Bullis et al. |
| 2015/0033811 A1 | 2/2015 | Sanders |
| 2016/0174547 A1 | 6/2016 | Sanders et al. |
| 2016/0174549 A1 | 6/2016 | Sanders et al. |
| 2016/0175469 A1 | 6/2016 | Sanders et al. |
| 2016/0177004 A1 | 6/2016 | Sanders et al. |
| 2016/0185678 A1 | 6/2016 | Sanders et al. |
| 2016/0272553 A1 | 9/2016 | Sanders et al. |

FOREIGN PATENT DOCUMENTS

| | | |
|---|---|---|
| CN | 1962565 A | 5/2007 |
| CN | 101423431 A | 5/2009 |
| CN | 101519324 A | 9/2009 |
| CN | 101575243 A | 11/2009 |
| CN | 101580409 | 11/2009 |
| CN | 101792348 A | 8/2010 |
| CN | 101830571 A | 9/2010 |
| CN | 101885798 A | 11/2010 |
| CN | 101885888 A | 11/2010 |
| CN | 102154013 A | 8/2011 |
| DE | 2558551 A1 | 7/1977 |
| DE | 2822488 A1 | 11/1979 |
| DE | 4122490 A1 | 1/1993 |
| DE | 4132620 A1 | 4/1993 |
| EP | 0290807 A2 | 11/1988 |
| EP | 0314070 A2 | 5/1989 |
| EP | 0337694 A2 | 10/1989 |
| EP | 0683985 A1 | 11/1995 |
| EP | 0877076 A2 | 11/1998 |
| EP | 0892111 A1 | 1/1999 |
| EP | 0976699 A1 | 2/2000 |
| EP | 1024692 A1 | 8/2000 |
| EP | 1230195 A1 | 8/2002 |
| EP | 2135854 A2 | 12/2009 |
| GB | 1324087 | 7/1973 |
| JP | 54050027 A | 4/1979 |
| JP | 54077294 A | 6/1979 |
| JP | S58131903 A | 8/1983 |
| JP | 60101194 A | 5/1985 |
| JP | 62096046 A | 5/1986 |
| JP | 61282301 A | 12/1986 |
| JP | 63083169 A | 4/1988 |
| JP | 63148937 A | 6/1988 |
| JP | 03112426 | 5/1991 |
| JP | H07215746 A | 8/1995 |
| JP | 08092591 A | 4/1996 |
| JP | 11092788 A | 4/1999 |
| JP | 2008023433 A | 2/2008 |
| RU | 2051884 C1 | 1/1996 |
| RU | 2378869 C1 | 1/2010 |
| WO | 9715367 A1 | 5/1997 |
| WO | 9918785 A1 | 4/1999 |
| WO | 9948833 A1 | 9/1999 |
| WO | 02071086 A1 | 9/2002 |
| WO | 2006131213 A1 | 12/2006 |
| WO | 2007003388 A2 | 1/2007 |
| WO | 2009060012 A2 | 5/2009 |
| WO | 2009061930 A1 | 5/2009 |
| WO | 2015031521 A1 | 3/2015 |
| WO | 2015035031 A1 | 3/2015 |
| WO | 2015116716 A1 | 8/2015 |
| WO | 2015179552 A1 | 11/2015 |
| WO | 2015179687 A1 | 11/2015 |

OTHER PUBLICATIONS

Blair. Sulphur Enhanced Fertilizer (SEF). A new generation of fertilizers. The Proceedings of the International Plant Nutrition Colloquium XVI, Department of Plant Sciences, UC Davis, [Online] 2009.

Chen, et al. *Effect of a Polymer on Mitigating Ammonia Emission from Liquid Dairy Manure*. Efekat polimera na smanjenje emisije /Polj. tehn. (Jan. 2013), 1-13.

Chiba, Lee I. *Animal Nutrition Handbook, Section 12: Poultry Nutrition and Feeding*. pp. 316-331, 2009—available online at http://www.ag.auburn.edu/%7Echibale/an12poultryfeeding.pdf.

Chien et al. *Review of Maleic-Itaconic Acid Copolymer Purported as Urease Inhibitor and Phosphorus Enhancer in Soils..* Agronomy Journal 106(2) : 423-430, 2014.

CN Search Report in Application No. 201080047969.4 received with First Office Action dated Jul. 31, 2013.

Davidson et al. *Persistence of Rhizobium japonicum on the Soybean Seed Coat Under Controlled Temperature and Humidity*. Applied and Environmental Microbiology, 35 : 94-96, 1978.

EP Search Report 1 dated Jun. 16, 2016 in related Application No. 13847267.5.

EP Search Report 2 dated Jun. 10, 2016 in related Application No. 16161777.4.

EP Search Report 3 dated Jun. 13, 2016 in related Application No. 16161780.8.

EP Search Report 4 dated Jul. 26, 2016 in related Application No. 16161783.2.

EP Search Report 5 dated Jun. 13, 2016 in related Application No. 16161786.5.

EP Search Report 6 dated Jun. 20, 2016 in related Application No. 16161785.7.

Gay, et al. *Ammonia Emissions and Animal Agriculture*. Virginia Cooperative Extension, Publication 442-110, Virginia Polytechnic Institute and State University, 2009.

*Grains/Fertilizers*, article found online at martinsachs.angelfire. com/feeding.html, dated Apr. 11, 2010.

Groenstein, C.M. et al. *Measures to Reduce Ammonia Emissions from Livestock Manures; Now, Soon, Later*. Wageningen UK Livestock Research; Report 488; Jun. 2011.

Herrington et al. *Rheological modification of bitumen with maleic anhydride and dicarboxylic acids*. Fuel, 78 : 101-110, 1999.

International Preliminary Report on Patentability 1 in corresponding application PCT/US 2014/052987, dated Mar. 10, 2016.

(56) References Cited

OTHER PUBLICATIONS

International Preliminary Report on Patentability 2 in related application PCT/US 2014/054069, dated Dec. 11, 2014.
International Search Report and Written Opinion 1 in related application PCT/US 2010/050244, dated Jun. 27, 2011.
International Search Report and Written Opinion 2 in related application PCT/US 2013/064378, dated Jan. 23, 2014 (Note: for cited reference RU2375063, see U.S. Pat. No. 6,936,598).
International Search Report and Written Opinion 3 in related application PCT/US 2013/054373, dated Dec. 12, 2013.
International Search Report and Written Opinion 4 in corresponding application PCT/US 2014/052987, dated Jan. 16, 2015.
International Search Report and Written Opinion 5 in related application PCT/US 2014/054069, dated Dec. 11, 2014.
International Search Report and Written Opinion 6 in related application PCT/US 2014/049451, dated Dec. 18, 2014.
International Search Report and Written Opinion 7 in related application PCT/US 2014/039424, dated Oct. 16, 2014.
International Search Report and Written Opinion 8 in related application PCT/US 2015/013345, dated Apr. 13, 2015.
International Search Report and Written Opinion 9 in related application PCT/US 2015/032037, dated Aug. 28, 2015.
International Search Report and Written Opinion 10 in related application PCT/US 2015/031823, dated Aug. 28, 2015.
Jung et al. *Polymer-entrapped rhizobium as an inoculants for legumes.* Plant and Soil, 65 : 219-231, 1982.
Kahraman et al. *Bioengineering Polyfunctional Copolymers. VII. Synthesis and characterization of copolymers of p-vinylphenyl boronic acid with maleic and citraconic anhydrides and their self-assembled macrobranched supramolecular architectures.* Polymer 45 :5813-5828, 2004.
Kejun et al., *Copolymerization of cis-Butenedioic Acid with Sodium Methallylsulfonate in Aqueous Solution.* J. App. Poly. Sci., vol. 40 : 1529-1539; 1990.
Li et al. *Dispersion and Rheological Properties of Concentrated Kaolin Suspensions with Polycarboxylate Copolymers Bering Comb-like Side Chains.* Journal of the European Ceramic Society, 34(1) :137-146, Jan. 2014.
Machida et al. *Water Soluble Polymers. lx. N-(2-chloroethyl)-sulfonamides of Styrene-maleic Acid and Styrene-itaconic Acid Copolymers.* Sen'i Gakkaishi 22(6) :269-73,1996.
Mohan, Prasanthrajan et al. *Addressing the Challenges of Ammonia Loss from Poultry Droppings through Indigenous Carbon Wastes.* International Journal of Environmental Science and Development, 3 (4), Aug. 2012—available online at http://www.ijesd.org/papers/255-D590.pdf.
Naga et al. *Polymeric Additives for Pour Point Depression of Residual Fuel Oils.* J. Chem. Tech. Biotechnol. 35A : 241-247, 1985.
Patterson, Paul H. *Hen House Ammonia: Environmental Consequences and Dietary Strategies.* Multi-State Poultry Meeting, May 14-16, 2002—available online at http://www.ijesd.org/papers/255-D590.pdf.
Powers, Wendy. *Practices to Reduce Ammonia.* 2004—available online at http://www.thepoultrysite.com/articles/219/practices-to-reduce-ammonia.
Prochnow, L.I. et al. *Controlling Ammonia Losses During Manure Composting with the Addition of Phosphogypsum and Simple Superphosphate.* Sci.Agri., Piracicaba, 52(2) :346-349, mai/ago 1995.
Puoci et al. *Polymer in Agriculture: a Review.* American Journal of Agricultural and Biological Sciences, 3 :299-314, 2008.
Sanderson, et al. *Effect of Gypsum and Elemental Sulphur on Calcium and Sulphur Content of Rutabagas in Podzolic Soils.* Can J Plan Sci [Online], pp. 785-788, 2002.
Shakkthivel et al. *Newly Developed Itaconic Acid Copolymers for Gypsum and Calcium Carbonate Scale Control.* Journal of Applied Polymer Science, 103(5) :3206-3213, 2007.
Singh, A. et al. *Efficacy of Urease Inhibitor to Reduce Ammonia Emission from Poultry Houses.* J. Appl. Poult. Res., 18 :34-42, 2009—available online at http://japr.fass.org/content/18/1/34.full.
*Sodium Lignosulphonate.* Available online at www.xyd-chem.com on Apr. 20, 2010.
U.S. Provisional Patent Application entitled Polyanionic Polymers, U.S. Appl. No. 62/001,110, filed May 21, 2014.
Weir, B.S. The current taxonomy of rhizobia. NZ Rhizobia website. http://www.rhizobia.co.nz/taxonomy/rhizobia; Partial update: May 2, 2013.
Yang, Charles Q. et al. *In-situ Polymerization of Maleic Acid and Itaconic Acid and Crosslinking of Cotton Fabric.* Textile Research Journal, 69(10) :782-789, 1999.
Yang, Charles Q. et al. *In-situ Polymerization of Maleic Acid and Itaconic Acid on Cotton: MALDI/TOF Mass Spectroscopy and Light-Scattering Study.* Textile Research Journal, 70(4) :359-62, 2000.
Yanhe et al. *Synthesis and Performance of Itaconic Acid-Maleic Acid Copolymer.* .Indus. Wat. Treat. 2006 10, pagination unknown. DOI: cnki:ISSN:1005-829X.0.2006-10-017.
Yasmin, et al. *Effect of Elemental Sulfur, Gypsum, and Elemental Sulfur Coated Fertilizers on the Availability of Sulfur to Rice.* J Plant Nutr [Online], 20(1): 79-91, 2007.
Zhang et al. *Synthesis and Inhibition Efficiency of a Novel Quadripolymer Inhibitor.* Chin. J. Ch. E. 15(4) :600; 2007.
PCT International Search Report and Written Opinion from PCT Application No. PCT/US2015/032037 entitled Polymer Soil Treatment Compositions Including Humic Acids (dated Aug. 28, 2015).
Chien, S.H. et al.; "Review of Maleic-itaconic acid copolymer purported as urease inhibitor and phosphorus enhancer in soils;" Agronomy Journal, vol. 106, Issue 2 (Mar. 6, 2014).

* cited by examiner

POLYMER SOIL TREATMENT COMPOSITIONS INCLUDING HUMIC ACIDS

CROSS-REFERENCE TO RELATED APPLICATION

This is a National Phase Application pursuant to 35 U.S.C. § 371 of International Application No. PCT/US2015/032037, filed May 21, 2015, which claims the benefit of U.S. Provisional application Ser. No. 62/001,376, filed May 21, 2014, each of which is hereby incorporated in its entirety by reference herein.

BACKGROUND OF THE INVENTION

Field of the Invention

The present invention is broadly concerned with humic acid compositions having significant commercial utilities. More particularly, the invention is concerned with such compositions, as well as methods of treating soil using the same, wherein the compositions comprise humic acids with one or more polyanionic polymers.

Description of the Prior Art

Humic acids are a principal component of humic substances, which are the major organic constituents of soil, peat, lignite coal, and leonardite, the latter being a highly oxidized form of organic matter technically known as low rank coal between peat and sub-bituminous coal. Humic acids have also been defined as the fraction of humic substances that is not soluble in water under acidic conditions (pH less than 2), but is soluble at higher pH levels. Humic acids include fulvic acids, which are generally lighter in color and have a lower molecular weight. Humic acid is commercialized as solid or liquid products, and is readily available.

Humic acid is known to have a number of desirable agricultural utilities. For example, crusted or saline soils of high sodium content can be successfully treated with humic acids, which serves to improve the tilth and workability of soil, and to increase the aeration thereof. Additionally, humic acids are believed to enhance plant growth by increasing root respiration and formation, and to generally stimulate seed germination and plant development.

However, humic acids are sometimes slow-acting, and thus the beneficial results from application thereof may not be realized for a considerable period of time. There is accordingly a need in the art for improved humic acid compositions which can be more readily taken up by soils for remediation thereof or for seed and plant growth stimulation.

Verdesian Life Sciences, LLC commercializes a series of maleic-itaconic copolymer products designed to enhance the plant uptake of phosphates and micronutrients when applied to seeds or the soil adjacent seeds or growing plants. Among these products are AVAIL® liquid compositions for use with liquid or granular phosphate fertilizers. The liquid fertilizer product is a partial ammonium salt of a maleic-itaconic copolymer having a pH of about 2, whereas the granular fertilizer product is a partial sodium salt of maleic-itaconic copolymer having a pH of about 6-8. While these products have proven to be very successful commercially, they are relatively expensive, several hundred dollars per gallon to growers. If compositions could be devised which substantially less expensive while giving substantially equivalent performance, this would be a significant breakthrough in the art.

SUMMARY OF THE INVENTION

The present invention addresses these problems and provides improved humic acid compositions generally comprising humic acids and one or more polyanionic polymers, and especially the alkali metal (e.g., Na), alkaline earth metal (e.g., Ca), and ammonium salts of such polymers. The polymer fraction of the compositions interacts with soil and preferentially reacts with polyvalent cations, whereas the humic acid fraction preferentially reacts with monovalent cations. Thus, the effectiveness of each fraction is augmented by the presence of the other fraction. The humic acid and polymeric fractions of the compositions are mixed together in the form of aqueous dispersions, which can be readily applied to soil. The compositions are applied in the same manner, and with the same concentrations of humic acids therein as conventional humic acid compositions.

The polymers preferably include dicarboxylate repeat units, such as maleic and itaconic repeat units. In some embodiments, the polymers include sulfonate repeat units. The polymers may be in the acid form or as partial or total salts, and especially calcium salts, and generally should have a pH of from about 1-8, depending upon the intended end use. For example, when the polymer is used in conjunction with certain types of fertilizers, very low pH values are preferred, from about 1-4, and more preferably from about 1-2.

The complete compositions of the invention are usually in the form of aqueous dispersions or solutions, and the volumetric ratio of the polymer product fraction thereof (including the water) to the humic acid product fraction (also including the water) should be from about 1:2 to 1:8, and more preferably from about 1:3 to 1:6.

The weight ratio of polymer to humic acid in the complete compositions (i.e., in the absence of water and other incidental ingredients) should range from about 1:1 to 1:5, and more preferably from about 1:1 to 1:3.

DETAILED DESCRIPTION OF THE PREFERRED EMBODIMENT

The Polyanionic Polymers

Generally speaking, the polymers of the invention should have a molecular weight of about 500-5,000,000, more preferably from about 1500-50,000, and contain at least three and preferably more repeat units per molecule (preferably from about 10-500). Moreover, the partial or complete calcium salts of the polymers should be water dispersible and preferably water soluble, i.e., they should be dispersible or soluble in pure water to a level of at least about 5% w/w at room temperature with mild agitation. It is desirable that the polymers be highly complexed with calcium, e.g., at least about 90 mole percent of the repeat units should be reacted with calcium, and preferably essentially 100% thereof.

Advantageously, at least about 50% (by mole) of repeat units contain at least 1 carboxylate group. These species also are typically capable of forming stable solutions in pure water up to at least about 20% w/w solids at room temperature.

To summarize, the preferred polymers of the invention have the following characteristics:

The polymers should be dispersible and more preferably fully soluble in water.

The polymers should have a significant number of anionic functional groups, preferably at least about 90 mole percent by weight, more preferably at least about 96 mole percent by weight, and most preferably the polymers are essentially free of non-anionic functional groups.

A high proportion of the polymers should have the anionic groups thereof reacted with calcium.

The polymers are stable thermally and chemically for convenient use.

The polymers should be essentially free of ester groups, i.e., no more than about mole percent thereof, and most preferably no more than about 1 mole percent.

The polymers should have only a minimum number of amide-containing repeat units, preferably no more than about 10 mole percent thereof, and more preferably no more than about 5 mole percent.

The polymers should have only a minimum number of monocarboxylate repeat units, preferably no more than about 10 mole percent thereof, and more preferably no more than about 5 mole percent.

The ensuing detailed description of preferred polymers makes use of the art-accepted term "repeat units" to identify the moieties in the polymers. As used herein, "repeat unit" refers to chemically converted forms (including isomers and enantiomers) of initially chemically complete monomer molecules, where such repeat units are created during polymerization reactions, with the repeat units bonding with other repeat units to form a polymer chain. Thus, a type B monomer will be converted to a type B repeat unit, and type C and type G monomers will be converted type C and G repeat units, respectively. For example, the type B maleic acid monomer will be chemically converted owing to polymerization conditions to the corresponding type B maleic acid repeat unit, as follows:

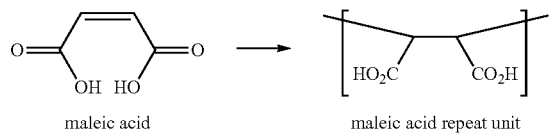

maleic acid → maleic acid repeat unit

Different monomers within a given polymerization mixture are converted to corresponding repeat units, which bond to each other in various ways depending upon the nature of the repeat groups and the polymerization reaction conditions, to create the final polymer chain, apart from end groups.

Generally speaking, all carboxylate- and sulfonate-containing copolymers are within the scope of the invention. For example, carboxylate repeat units derived from itaconic and/or maleic moieties are suitable, as are alkylallyl sulfonate repeat units, e.g., methallyl sulfonate. However, in carrying out the invention, it has been determined that certain specific families or classes of polyanionic polymers are particularly suitable. These are described below as "Class I," "Class IA," and "Class II" polymers. Of course, mixtures of these polymer classes are also contemplated.

Class I Polymers

The Class I polyanionic polymers of the present invention are at least tetrapolymers, i.e., they are composed of at least four different repeat units individually and independently selected from the group consisting of type B, type C, and type G repeat units, and mixtures thereof, described in detail below. However, the Class I polymers comprehend polymers having more than four distinct repeat units, with the excess repeat units being selected from the group consisting of type B, type C, and type G repeat units, and mixtures thereof, as well as other monomers or repeat units not being type B, C, or G repeat units.

Preferred Class I polymers contain at least one repeat unit from each of the B, C, and G types, one other repeat unit selected from the group consisting of type B, type C, and type G repeat units, and optionally other repeat units not selected from type B, type C, and type G repeat units. Particularly preferred polymers comprise a single type B repeat unit, a single type C repeat unit, and two different type G repeat units, or two different type B repeat units, a single type C repeat unit, and one or more different type G repeat units.

However constituted, preferred Class I polymers contain at least about 90 mole percent (more preferably at least about 96 mole percent) of repeat units selected from the group consisting of type B, C, and G repeat units (i.e., the polymers should contain no more than about 10 mole percent (preferably no more than about 4 mole percent) of repeat units not selected from types B, C, and G).

The Class I polymers are easily converted to partial or fully saturated calcium salts by a simple reaction with an appropriate calcium compound. Additionally, the Class I polymers may contain other salt-forming cations in minor amounts. Other secondary cations can be simple cations such as sodium, but more complex cations can also be used, such as cations containing a metal atom and other atom(s) as well, e.g., vanadyl cations. Among preferred additional metal cations are those derived from alkali, additional alkaline earth, and transition metals. The additional cations may also be amines (as used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species). The most preferred class of amines are alkyl amines, where the alkyl group(s) have from 1-30 carbon atoms and are of straight or branched chain configuration. Such amines should be essentially free of aromatic rings (no more than about 5 mole percent aromatic rings, and more preferably no more than about 1 mole percent thereof). A particularly suitable alkyl amine is iso-propylamine. These possible secondary cations should be reacted with no more than about 10 mole percent of the repeat units of the polymer.

1. Type B Repeat Units

Type B repeat units are dicarboxylate repeat units derived from monomers of maleic acid and/or anhydride, fumaric acid and/or anhydride, mesaconic acid and/or anhydride, substituted maleic acid and/or anhydride, substituted fumaric acid and/or anhydride, substituted mesaconic acid and/or anhydride, mixtures of the foregoing, and any isomers, esters, acid chlorides, and partial or complete salts of any of the foregoing. As used herein with respect to the type B repeat units, "substituted" species refers to alkyl substituents (preferably C1-C6 straight or branched chain alkyl groups substantially free of ring structures), and halo substituents (i.e., no more than about 5 mole percent of either ring structures or halo substituents, preferably no more than about 1 mole percent of either); the substituents are normally bound to one of the carbons of a carbon-carbon double bond of the monomer(s) employed. In preferred forms, the total amount of type B repeat units in the Class I polymers of the invention should range from about 1-70 mole percent, more preferably from about 20-65 mole percent, and most preferably from about 35-55 mole percent, where the total amount of all of the repeat units in the Class I polymer is taken as 100 mole percent.

Maleic acid, methylmaleic acid, maleic anhydride, methylmaleic anhydride, and mesaconic acid (either alone or as various mixtures) are the most preferred monomers for generation of type B repeat units. Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial polymerization, this should be followed by hydrolysis (acid or base) of pendant ester groups to generate a final carboxylated polymer substantially free of ester groups.

2. Type C Repeat Units

Type C repeat units are derived from monomers of itaconic acid and/or anhydride, substituted itaconic acid and/or anhydride, as well as isomers, esters, acid chlorides, and partial or complete salts of any of the foregoing. The type C repeat units are present in the preferred Class I polymers of the invention at a level of from about 1-80 mole percent, more preferably from about 15-75 mole percent, and most preferably from about 20-55 mole percent, where the total amount of all of the repeat units in the polymer is taken as 100 mole percent.

The itaconic acid monomer used to form type C repeat unit has one carboxyl group, which is not directly attached to the unsaturated carbon-carbon double bond used in the polymerization of the monomer. Hence, the preferred type C repeat unit has one carboxyl group directly bound to the polymer backbone, and another carboxyl group spaced by a carbon atom from the polymer backbone. The definitions and discussion relating to "substituted," "salt," and useful salt-forming cations (metals, amines, and mixtures thereof) with respect to the type C repeat units, are the same as those set forth for the type B repeat units.

Unsubstituted itaconic acid and itaconic anhydride, either alone or in various mixtures, are the most preferred monomers for generation of type C repeat units. Again, if itaconic anhydride is used as a starting monomer, it is normally useful to convert the itaconic anhydride monomer to the acid form in a reaction vessel just before or even during the polymerization reaction. Any remaining ester groups in the polymer are normally hydrolyzed, so that the final carboxylated polymer is substantially free of ester groups.

3. Type G Repeat Units

Type G repeat units are derived from substituted or unsubstituted sulfonate-bearing monomers possessing at least one carbon-carbon double bond and at least one sulfonate group, in acid, partial or complete salt, or other form, and which are substantially free of aromatic rings and amide groups (i.e., no more than about 5 mole percent of either aromatic rings or amide groups, preferably no more than about 1 mole percent of either). The type G repeat units are preferably selected from the group consisting of C1-C8 straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts. The total amount of type G repeat units in the Class I polymers of the invention should range from about 0.1-65 mole percent, more preferably from about 1-35 mole percent, and most preferably from about 1-25 mole percent, where the total amount of all of the repeat units in the Class I polymer is taken as 100 mole percent. The definitions and discussion relating to "substituted," "salt," and useful salt-forming cations (metals, amines, and mixtures thereof) with respect to the type G repeat units, are the same as those set forth for the type B repeat units.

Vinylsulfonic acid, allylsulfonic acid, and methallylsulfonic acid, either alone or in various mixtures, are deemed to be the most preferred monomers for generation of type G repeat units. It has also been found that alkali metal salts of these acids are also highly useful as monomers. In this connection, it was unexpectedly discovered that during polymerization reactions yielding the novel polymers of the invention, the presence of mixtures of alkali metal salts of these monomers with acid forms thereof does not inhibit completion of the polymerization reaction.

Further Preferred Characteristics of the Class I Polymers

As noted previously, the total abundance of type B, C, and G repeat units in the Class I polymers of the invention is preferably at least about 90 mole percent, more preferably at least about 96 mole percent, and most preferably the polymers consist essentially of or are 100 mole percent B, C, and G-type repeat units. It will be understood that the relative amounts and identities of polymer repeat units can be varied, depending upon the specific properties desired in the resultant polymers. Moreover, it is preferred that the Class I polymers of the invention contain no more than about 10 mole percent of any of (I) non-carboxylate olefin repeat units, (ii) ether repeat units, (iii) ester repeat units, (iv) non-sulfonated monocarboxylic repeat units, and (v) amide-containing repeat units. "Non-carboxylate" and "non-sulfonated" refers to repeat units having essentially no carboxylate groups or sulfonate groups in the corresponding repeat units, namely less that about 55 by weight in the repeat units. Advantageously, the mole ratio of the type B and type C repeat units in combination to the type G repeat units (that is, the mole ratio of (B+C)/G) should be from about 0.5-20:1, more preferably from about 2:1-20:1, and still more preferably from about 2.5:1-10:1. Still further, the polymers should be essentially free (e.g., less than about 1 mole percent) of alkyloxylates or alkylene oxide (e.g., ethylene oxide)-containing repeat units, and most desirably entirely free thereof.

The preferred Class I polymers of the invention have the repeat units thereof randomly located along the polymer chain without any ordered sequence of repeat units. Thus, the polymers hereof are not, e.g., alternating with different repeat units in a defined sequence along the polymer chain.

It has also been determined that the preferred Class I polymers of the invention should have a very high percentage of the repeat units thereof bearing at least one anionic group, e.g., at least about 80 mole percent, more preferably at least about 90 mole percent, and most preferably at least about 95 mole percent. It will be appreciated that the B and C repeat units have two anionic groups per repeat unit, whereas the preferred sulfonate repeat units have one anionic group per repeat unit.

For a variety of applications, certain tetrapolymer compositions are preferred, i.e., a preferred polymer backbone composition range (by mole percent, using the parent monomer names of the corresponding repeat units) is: maleic acid 35-50%; itaconic acid 20-55%; methallylsulfonic acid 1-25%; and allylsulfonic sulfonic acid 1-20%, where the total amount of all of the repeat units in the polymer is taken as 100 mole percent. It has also been found that even small amounts of repeat units, which are neither B nor C repeat units, can significantly impact the properties of the final polymers, as compared with prior BC polymers. Thus, even 1 mole percent of each of 2 different G repeat units can result in a tetrapolymer exhibiting drastically different behaviors, as compared with BC polymers.

The molecular weight of the polymers is also highly variable, again depending principally upon the desired properties. Generally, the molecular weight distribution for polymers in accordance with the invention is conveniently measured by size exclusion chromatography. Broadly, the molecular weight of the polymers ranges from about 800-50,000, and more preferably from about 1000-5000. For some applications, it is advantageous that at least 90% of the finished polymer be at or above a molecular weight of about 1000 measured by size exclusion chromatography in 0.1 M sodium nitrate solution via refractive index detection at 35° C. using polyethylene glycol standards. Of course, other techniques for such measurement can also be employed.

Especially preferred Class I polymers include the following repeat units: maleic—from about 30-55 mole percent, more preferably from about 40-50 mole percent, and most preferably about 45 mole percent; itaconic—from about 35-65 mole percent, more preferably from about 40-60 mole percent, and most preferably about 50 mole percent; methallylsulfonic—from about 1-7 mole percent, more preferably from about 3-6 mole percent, and most preferably about 4 mole percent; and allylsulfonic—from about 0.1-3 mole percent, more preferably from about 0.5-2 mole percent, and most preferably about 1 mole percent. This type of polymer is typically produced as a partial alkali metal salt (preferably sodium) at a pH of from about 0.2-3, more preferably from about 0.3-2, and most preferably about 1. The single most preferred polymer of this type is a partial sodium salt having a pH of about 1, with a repeat unit molar composition of maleic 45 mole percent, itaconic 50 mole percent, methallylsulfonic 4 mole percent, and allylsulfonic 1 mole percent. This specific polymer is referred to herein as the "T5" polymer.

Syntheses of the Class I Polymers

Virtually any conventional method of free radical polymerization may be suitable for the synthesis of the Class I polymers of the invention. However, a preferred and novel synthesis may be used, which is applicable not only for the production of the Class I polymers of the invention, but also for the synthesis of polymers containing dicarboxylate repeat units and sulfonate repeat units and preferably containing at least one carbon-carbon double bond. Such types of polymers are disclosed in U.S. Pat. Nos. 5,536,311 and 5,210,163.

Generally speaking, the new synthesis methods comprise carrying out a free radical polymerization reaction between dicarboxylate and sulfonate repeat units in the presence of hydrogen peroxide and vanadium-containing species to achieve a conversion to polymer in excess of 90%, and more preferably in excess of 98%, by mole. That is, a dispersion of the dicarboxylate and sulfonated monomers is created and free radical initiator(s) are added followed by allowing the monomers to polymerize.

Preferably, the hydrogen peroxide is the sole initiator used in the reaction, but in any case, it is advantageous to conduct the reaction in the absence of any substantial quantities of other initiators (i.e., the total weight of the initiator molecules used should be about 95% by weight hydrogen peroxide, more preferably about 98% by weight, and most preferably 100% by weight thereof). Various sources of vanadium may be employed, with vanadium oxysulfates being preferred.

It has been discovered that it is most advantageous to perform these polymerization reactions in substantially aqueous dispersions (e.g., at least about 95% by weight water, more preferably at least about 98% by weight water, and most preferably 100% by weight water). The aqueous dispersions may also contain additional monomer, but only to the minor extent noted.

It has also been found that the preferred polymerization reactions may be carried out without the use of inert atmospheres, e.g., in an ambient air environment. As is well known in the art, free radical polymerization reactions in dispersions are normally conducted in a way that excludes the significant presence of oxygen. As a result, these prior techniques involve such necessary and laborious steps as degassing, inert gas blanketing of reactor contents, monomer treatments to prevent air from being present, and the like. These prior expedients add to the cost and complexity of the polymerizations, and can present safety hazards. However, in the polymerizations of the polymers of the present invention, no inert gas or other related steps are required, although they may be employed if desired.

One preferred embodiment comprises creating highly concentrated aqueous dispersions of solid monomer particles (including saturated dispersions containing undissolved monomers) at a temperature of from about 50-125° C., more preferably from about 75-110° C., and adding vanadium oxysulfate to give a vanadium concentration in the dispersion of from about 1-1000 ppm, and more preferably from about 5-500 ppm (metals basis). This is followed by the addition of hydrogen peroxide over a period of from about 30 minutes-24 hours (more preferably from about 1-5 hours) in an amount effective to achieve polymerization. This process is commonly carried out in a stirred tank reactor equipped with facilities for controlling temperature and composition, but any suitable equipment used for polymerization may be employed.

Another highly preferred and efficient embodiment involves charging a stirred tank reactor with water, followed by heating and the addition of monomers to give a dispersion having from about 40-75% w/w solids concentration. Where maleic and/or itaconic monomers are employed, they may be derived either from the corresponding acid monomers, or from in situ conversion of the anhydrides to acid in the water. Carboxylate and sulfonated monomers are preferred in their acid and/or anhydride form, although salts may be used as well. Surprisingly, it has been found that incomplete monomer dissolution is not severely detrimental to the polymerization; indeed, the initially undissolved fraction of monomers will dissolve at some time after polymerization has been initiated.

After the initial heating and introduction of monomers, the reactor contents are maintained at a temperature between about 80-125° C. with the subsequent addition of vanadium oxysulfate. Up to this point in the reaction protocol, the order of addition of materials is not critical. After introduction of vanadium oxysulfate, a hydrogen peroxide solution is added over time until substantially all of the monomers are converted to polymer. Peroxide addition may be done at a constant rate, a variable rate, and with or without pauses, at a fixed or variable temperature. The concentration of peroxide solution used is not highly critical, although the concentration on the low end should not dilute the reactor contents to the point where the reaction becomes excessively slow or impractically diluted. On the high end, the concentration should not cause difficulties in performing the polymerization safely in the equipment being used.

Preferably, the polymerization reactions of the invention are carried out to exclude substantial amounts of dissolved iron species (i.e., more than about 5% by weight of such species, and more preferably substantially less, on the order of below about 5 ppm, and most advantageously under about 1 ppm). This is distinct from certain prior techniques requiring the presence of iron-containing materials. Nonetheless, it is acceptable to carry out the polymerization of the invention in 304 or 316 stainless steel reactors. It is also preferred to exclude from the polymerization reaction any significant amounts (nor more than about 5% by weight) of the sulfate salts of ammonium, amine, alkali and alkaline earth metals, as well as their precursors and related sulfur-containing salts, such as bisulfites, sulfites, and metabisulfites. It has been found that use of these sulfate-related compounds leaves a relatively high amount of sulfates and the like in the final polymers, which either must be separated or left as a product contaminant.

The high polymerization efficiencies of the preferred syntheses result from the use of water as a solvent and without the need for other solvents, elimination of other initiators (e.g., azo, hydroperoxide, persulfate, organic peroxides) iron and sulfate ingredients, the lack of recycling loops, so that substantially all of the monomers are converted to the finished polymers in a single reactor. This is further augmented by the fact that the polymers are formed first, and subsequently, if desired, partial or complete salts can be created.

EXAMPLES

The following examples describe preferred synthesis techniques for preparing polymers; it should be understood, however, that these examples are provided by way of illustration only and nothing therein should be taken as a limitation on the overall scope of the invention.

Example 1

Exemplary Synthesis

Apparatus:
A cylindrical reactor was used, capable of being heated and cooled, and equipped with efficient mechanical stirrer, condenser, gas outlet (open to atmosphere), solids charging port, liquids charging port, thermometer and peroxide feeding tube.

Procedure: Water was charged into the reactor, stirring was initiated along with heating to a target temperature of 95° C. During this phase, itaconic acid, sodium methallylsulfonate, sodium allylsulfonate, and maleic anhydride were added so as to make a 50% w/w solids dispersion with the following monomer mole fractions:
  maleic: 45%
  itaconic: 35%
  methallylsulfonate: 15%
  allylsulfonate: 5%
When the reactor temperature reached 95° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 5% of the dispersion weight in the reactor prior to peroxide addition. After the peroxide addition was complete, the reactor was held at 95° C. for two hours, followed by cooling to room temperature.

The resulting polymer dispersion was found to have less than 2% w/w total of residual monomers as determined by chromatographic analysis.

Example 2

Exemplary Synthesis

Apparatus:
Same as Example 1
Procedure: Water was charged into the reactor, stirring was initiated along with heating to a target temperature of 100° C. During this phase, itaconic acid, sodium methallylsulfonate, sodium allylsulfonate, and maleic anhydride were added so as to make a 70% w/w solids dispersion with the following monomer mole fractions:
  maleic: 45%
  itaconic: 50%
  methallylsulfonate: 4%
  allylsulfonate: 1%
When the reactor temperature reached 100° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 7.5% of the dispersion weight in the reactor prior to peroxide addition. After the peroxide addition was complete, the reactor was held at 100° C. for two hours, followed by cooling to room temperature.

The resulting polymer dispersion was found to have less than 1% w/w total of residual monomers as determined by chromatographic analysis.

Example 3

Preparation of Tetrapolymer Partial Salts

A tetrapolymer calcium sodium salt dispersion containing 40% by weight polymer solids in water was prepared by the preferred free radical polymerization synthesis of the invention, using an aqueous monomer reaction mixture having 45 mole percent maleic anhydride, 35 mole percent itaconic acid, 15 mole percent methallylsulfonate sodium salt, and 5 mole percent allylsulfonate. The final tetrapolymer dispersion had a pH of slightly below 1.0 and was a partial sodium salt owing to the sodium cation on the sulfonate monomers. At least about 90% of the monomers were polymerized in the reaction.

This sodium partial salt tetrapolymer was used to create 40% solids in water calcium salts. In each instance, apart from the sodium present in the tetrapolymer mixture, appropriate bases or base precursors (e.g., carbonates), or mixtures thereof were added to the aqueous tetrapolymer at room temperature to generate the corresponding salts. Specifically, the following basic reactants were employed with quantities of the tetrapolymer to give the following salts:
  Salt A—calcium carbonate and a minor amount of sodium hydroxide, pH 1.5.
  Salt B—calcium carbonate and a minor amount of sodium hydroxide, pH 3.5.

Example 4

Exemplary Synthesis

A terpolymer salt dispersion containing 70% by weight polymer solids in water was prepared using a cylindrical reactor capable of being heated and cooled, and equipped with an efficient mechanical stirrer, a condenser, a gas outlet open to the atmosphere, respective ports for charging liquids and solids to the reactor, a thermometer, and a peroxide feeding tube.

Water (300 g) was charged into the reactor with stirring and heating to a target temperature of 95° C. During heating, itaconic acid, sodium methallylsulfonate, and maleic anhydride were added so as to make a 75% w/w solids dispersion with the following monomer mole fractions: maleic anhydride—20%; itaconic acid—60%; methallylsulfonate sodium salt—20%. When the monomers were initially added, they were in suspension in the water. As the temperature rose, the monomers became more fully dissolved before polymerization was initiated, and the maleic anhydride was hydrolyzed to maleic acid. When the reactor temperature reached 95° C., vanadium oxysulfate was added to yield a vanadium metal concentration of 50 ppm by weight of the reactor contents at the time of addition of the vanadium salt. After the vanadium salt fully dissolved, hydrogen peroxide was added as a 50% w/w dispersion in water continuously over two hours. At the time of hydrogen peroxide addition, not all of the monomers were completely dissolved, achieving what is sometimes referred to as "slush polymerization"; the initially undissolved monomers were subsequently dissolved during the course of the reaction. The total amount of hydrogen peroxide added equaled 5% of the dispersion weight in the reactor before addition of the peroxide.

After the peroxide addition was completed, the reaction mixture was held at 95° C. for two hours, and then allowed to cool to room temperature. The resulting polymer dispersion had a pH of slightly below 1.0 and was a partial sodium salt owing to the sodium cation on the sulfonate monomers. The dispersion was found to have a monomer content of less than 2% w/w, calculated as a fraction of the total solids in the reaction mixture, as determined by chromatographic analysis. Accordingly, over 98% w/w of the initially added monomers were converted to polymer.

Class IA Polymers

Class IA polymers contain both carboxylate and sulfonate functional groups, but are not the tetra- and higher order polymers of Class I. For example, terpolymers of maleic, itaconic, and allylsulfonic repeat units, which are per se known in the prior art, will function as the polyanionic polymer component of the compositions of the invention. The Class IA polymers thus are normally homopolymers, copolymers, and terpolymers, advantageously including repeat units individually and independently selected from the group consisting of type B, type C, and type G repeat units, without the need for any additional repeat units. Such polymers can be synthesized in any known fashion, and can also be produced using the previously described Class I polymer synthesis.

Class IA polymers preferably have the same molecular weight ranges and the other specific parameters (e.g., pH and polymer solids loading) previously described in connection with the Class I polymers, and may be converted to partial or complete calcium salts using the same techniques described with reference to the Class I polymers.

Class II Polymers

Broadly speaking, the polyanionic polymers of this class are of the type disclosed in U.S. Pat. No. 8,043,995 which is incorporated by reference herein in its entirety. The polymers include repeat units derived from at least two different monomers individually and respectively taken from the group consisting of what have been denominated for ease of reference as B' and C' monomers; alternately, the polymers may be formed as homopolymers or copolymers from recurring C' monomers. The repeat units may be randomly distributed throughout the polymer chains.

In detail, repeat unit B' is of the general formula

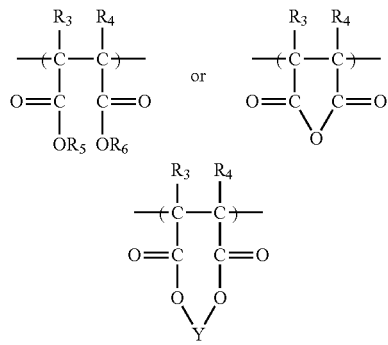

and repeat unit C' is of the general formula

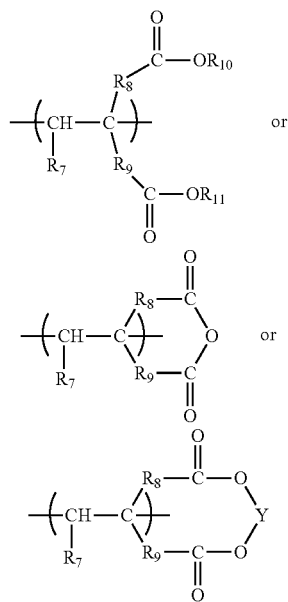

wherein each $R_7$ is individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl formate ($C_0$), acetate ($C_1$), propionate ($C_2$), butyrate ($C_3$), etc. up to $C_{30}$ based ester groups, R'$CO_2$ groups, OR' groups and COOX groups, wherein R' is selected from the group consisting of $C_1$-$C_{30}$ straight, branched chain and cyclic alkyl or aryl groups and X is selected from the group consisting of H, the alkali metals, $NH_4$ and the $C_1$-$C_4$ alkyl ammonium groups, $R_3$ and $R_4$ are individually and respectively selected from the group consisting of H, $C_1$-$C_{30}$ straight, branched chain and cyclic alkyl or aryl groups, $R_5$, $R_6$, $R_{10}$ and $R_{11}$ are individually and respectively selected from the group consisting of H, the alkali metals, $NH_4$ and the $C_1$-$C_4$ alkyl ammonium groups, Y is selected from the group consisting of Fe, Mn, Mg, Zn, Cu, Ni, Co, Mo, V, W, the alkali metals, the alkaline earth metals, polyatomic cations containing any of the foregoing (e.g., $VO^{+2}$), amines, and mixtures thereof; and $R_8$ and $R_9$ are individually and respectively selected from the group consisting of nothing (i.e., the groups are non-existent), $CH_2$, $C_2H_4$, and $C_3H_6$.

As can be appreciated, the Class II polymers typically have different types and sequences of repeat units. For example, a Class II polymer comprising B' and C' repeat units may include all three forms of B' repeat units and all three forms of C' repeat units. However, for reasons of cost and ease of synthesis, the most useful Class II polymers are made up of B' and C' repeat units. In the case of the Class II polymers made up principally of B' and C' repeat units, $R_5$, $R_6$, $R_{10}$, and $R_{11}$ are individually and respectively selected from the group consisting of H, the alkali metals, $NH_4$, and the $C_1$-$C_4$ alkyl ammonium groups. This particular Class II polymer is sometimes referred to as a butanedioic methylenesuccinic acid copolymer and can include various salts and derivatives thereof.

The Class II polymers may have a wide range of repeat unit concentrations in the polymer. For example, Class II polymers having varying ratios of B':C' (e.g., 10:90, 60:40, 50:50 and even 0:100) are contemplated and embraced by the present invention. Such polymers would be produced by varying monomer amounts in the reaction mixture from which the final product is eventually produced and the B' and C' type repeat units may be arranged in the polymer backbone in random order or in an alternating pattern.

The Class II polymers may have a wide variety of molecular weights, ranging for example from 500-5,000,000, depending chiefly upon the desired end use. Additionally, n can range from about 1-10,000 and more preferably from about 1-5,000.

Preferred Class II polymers are usually synthesized using dicarboxylic acid monomers, as well as precursors and derivatives thereof. For example, polymers containing mono and dicarboxylic acid repeat units with vinyl ester repeat units and vinyl alcohol repeat units are contemplated; however, polymers principally comprised of dicarboxylic acid repeat units are preferred (e.g., at least about 85%, and more preferably at least about 93%, of the repeat units are of this character). Class II polymers may be readily complexed with calcium using conventional methods and reactants.

Synthesis of the Class II Polymers of the Invention

In general, the Class II polymers are made by free radical polymerization serving to convert selected monomers into the desired polymers with repeat units. Such polymers may be further modified to impart particular structures and/or properties. A variety of techniques can be used for generating free radicals, such as addition of peroxides, hydroperoxides, azo initiators, persulfates, percarbonates, per-acid, charge transfer complexes, irradiation (e.g., UV, electron beam, X-ray, gamma-radiation and other ionizing radiation types), and combinations of these techniques. Of course, an extensive variety of methods and techniques are well known in the art of polymer chemistry for initiating free-radical polymerizations. Those enumerated herein are but some of the more frequently used methods and techniques. Any suitable technique for performing free-radical polymerization is likely to be useful for the purposes of practicing the present invention.

The polymerization reactions are carried out in a compatible solvent system, namely a system which does not unduly interfere with the desired polymerization, using essentially any desired monomer concentrations. A number of suitable aqueous or non-aqueous solvent systems can be employed, such as ketones, alcohols, esters, ethers, aromatic solvents, water and mixtures thereof. Water alone and the lower ($C_1$-$C_4$) ketones and alcohols are especially preferred, and these may be mixed with water if desired. In some instances, the polymerization reactions are carried out with the substantial exclusion of oxygen, and most usually under an inert gas such as nitrogen or argon. There is no particular criticality in the type of equipment used in the synthesis

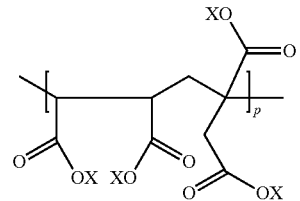

of the polymers, i.e., stirred tank reactors, continuous stirred tank reactors, plug flow reactors, tube reactors and any combination of the foregoing arranged in series may be employed. A wide range of suitable reaction arrangements are well known to the art of polymerization.

In general, the initial polymerization step is carried out at a temperature of from about 0° C. to about 120° C. (more preferably from about 30° C. to about 95° C. for a period of from about 0.25 hours to about 24 hours and even more preferably from about 0.25 hours to about 5 hours). Usually, the reaction is carried out with continuous stirring.

After the polymerization reaction is complete, the Class II polymers may be converted to partially or saturated calcium salts using conventional techniques and reactants.

Preferred Class II Maleic-Itaconic Polymers

The most preferred Class II polymers are composed of maleic and itaconic B' and C' repeat units and have the generalized formula
here X is either H or Ca, depending upon the level of salt formation.

In a specific example of the synthesis of a maleic-itaconic Class II polymer, acetone (803 g), maleic anhydride (140 g), itaconic acid (185 g) and benzoyl peroxide (11 g) were stirred together under inert gas in a reactor. The reactor provided included a suitably sized cylindrical jacketed glass reactor with mechanical agitator, a contents temperature measurement device in contact with the contents of the reactor, an inert gas inlet, and a removable reflux condenser. This mixture was heated by circulating heated oil in the reactor jacket and stirred vigorously at an internal temperature of about 65-70° C. This reaction was carried out over a period of about 5 hours. At this point, the contents of the reaction vessel were poured into 300 g water with vigorous mixing. This gave a clear solution. The solution was subjected to distillation at reduced pressure to drive off excess solvent and water. After sufficient solvent and water have been removed, the solid product of the reaction precipitates from the concentrated solution, and is recovered. The solids are subsequently dried in vacuo. A schematic representation of this reaction is shown below.

Step 1

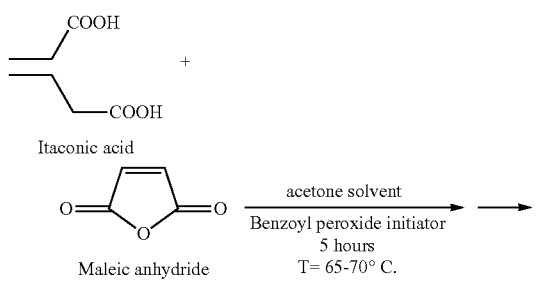

-continued

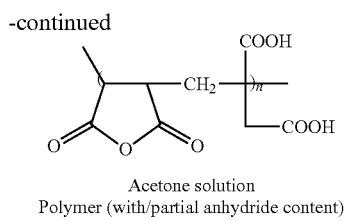

Acetone solution
Polymer (with/partial anhydride content)

Step 2

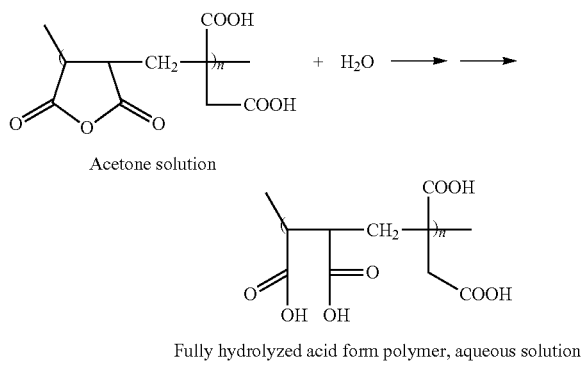

Fully hydrolyzed acid form polymer, aqueous solution

Once again, the Class II polymers should have the same preferred characteristics as those of the Class I and Class IA polymers set forth above.

The Humic Acids

There is no criticality in the humic acid fractions of the compositions of the invention. That is, the humic acids can be derived from any source and commercially available humic acid products typically having humic acid contents of around 20% by weight are eminently suited for use in the invention. The only real criterion for selection of humic acids is the intended use for the compositions in question. As used herein, "humic acid" refers to one or more different types of humic acid (e.g., fulvic acids) and the partial or complete humate salts thereof, e.g., potassium humates.

Uses of the Polymer/Humic Acid Compositions

The compositions of the invention have wide utility in agriculture. For example, they can be mixed with a variety of agricultural actives and applied to plants, the leaves of plants (foliar), the earth adjacent plants, or to plant seeds. The compositions increase the plants' uptake of both polymer-borne nutrients and ambient non-polymer nutrients found in the soil.

Thus, the compositions may be used to form composite products comprising the compositions in intimate contact with fertilizers. The use of such composite fertilizer products results in improved plant growth characteristics, presumably by increasing the availability of naturally occurring ambient nutrients. Typically, the composites are formed by application of from about 0.001 to about 100 lbs. of the polymer/humic acid composition per acre of soil or growing plants, and more preferably from about 0.005 to about 50 lbs. per acre, and still more preferably from about 0.01 to about 2 lbs per acre.

a. Fertilizer Uses

For example, the polymer/humic acid compositions may be used to form composite products where the polymers (in any form, such as liquids or granules) are mixed with or applied to fertilizer products including but not limited to phosphate-based fertilizers such as MAP, DAP, triple superphosphate, ordinary superphosphate, any one of a number of well-known N-P-K fertilizer products, and/or fertilizers containing nitrogen materials such as ammonia (anhydrous or aqueous), ammonium nitrate, ammonium sulfate, urea, ammonium phosphates, sodium nitrate, calcium nitrate, potassium nitrate, nitrate of soda, urea formaldehyde, metal (e.g., zinc, iron) ammonium phosphates; phosphorous materials such as calcium phosphates (normal phosphate and super phosphate), ammonium phosphate, ammoniated super phosphate, phosphoric acid, superphosphoric acid, basic slag, rock phosphate, colloidal phosphate, bone phosphate; potassium materials such as potassium chloride, potassium sulfate, potassium nitrate, potassium phosphate, potassium hydroxide, potassium carbonate; calcium materials, such as calcium sulfate, calcium carbonate, calcium nitrate; magnesium materials, such as magnesium carbonate, magnesium oxide, magnesium sulfate, magnesium hydroxide; sulfur materials such as ammonium sulfate, sulfates of other fertilizers discussed herein, ammonium thiosulfate, elemental sulfur (either alone or included with or coated on other fertilizers); micronutrients such as Zn, Mn, Cu, Fe, B, Mo, and other micronutrients discussed herein; oxides, sulfates, chlorides, and chelates of such micronutrients (e.g., zinc oxide, zinc sulfate and zinc chloride); such chelates sequestered onto other carriers such as EDTA; boron materials such as boric acid, sodium borate or calcium borate; organic wastes and waste waters such as manure, sewage, food processing industry by-products, and pulp and paper mill by-products; and molybdenum materials such as sodium molybdate. As known in the art, these fertilizer products can exist as dry powders/granules or as water dispersions. The fertilizers may be of the conventional variety, or they may be starter fertilizers.

In such contexts, the polymer/humic acid compositions may be mixed with the fertilizer products, applied as a surface coating to the fertilizer products, or otherwise thoroughly mixed with the fertilizer products. Preferably, in such composites, the fertilizer is in the form of particles having an average diameter of from about powder size (less than about 0.001 cm) to about 10 cm, more preferably from about 0.1 cm to about 2 cm, and still more preferably from about 0.15 cm to about 0.3 cm. The polymer/humic acid compositions are present in such composites at a level of from about 0.001 g to about 20 g composition per 100 g phosphate-based fertilizer, more preferably from about 0.1 g to about 10 g composition per 100 g phosphate-based fertilizer, and still more preferably from about 0.5 g to about 2 g composition per 100 g phosphate-based fertilizer. Again, the polymeric fraction of the polymer/humic acid compositions may include the polymers defined above in the acid form, or such polymers complexed with the aforementioned ions. The composite products are applied at a level of from about 0.001 to about 20 lbs. composite per acre of growing plants, more preferably from about 0.01 to about 10 lbs composite per acre of growing plants, and still more preferably from about 0.5 to about 2 lbs composite per acre of growing plants. The composites can likewise be applied as liquid dispersions or as dry granulated products, at the discretion of the user. When composites in accordance with the present invention are used as a coating, the composite comprises between about 0.005% and about 15% by weight of the coated fertilizer product, more preferably the composite comprises between about 0.01% and about 10% by weight of the coated fertilizer product, and most preferably between 0.5% and about 1% by weight of the coated fertilizer product.

Especially preferred polymers for use with humic acids in agricultural contexts include the following repeat units: maleic—from about 30-55 mole percent, more preferably from about 40-50 mole percent, and most preferably about 45 mole percent; itaconic—from about 35-65 mole percent, more preferably from about 40-60 mole percent, and most preferably about 50 mole percent; methallylsulfonic—from about 1-7 mole percent, more preferably from about 3-6 mole percent, and most preferably about 4 mole percent; and allylsulfonic—from about 0.1-3 mole percent, more preferably from about 0.5-2 mole percent, and most preferably about 1 mole percent. This type of polymer is typically produced as a partial alkali metal salt (preferably sodium) at a pH of from about 0.2-3, more preferably from about 0.3-2, and most preferably about 1. The single most preferred polymer of this type is a partial sodium salt having a pH of about 1, with a repeat unit molar composition of maleic 45 mole percent, itaconic 50 mole percent, methallylsulfonic 4 mole percent, and allylsulfonic 1 mole percent. This specific polymer is referred to herein as the "T5" polymer.

b. Uses with Sulfur-Bearing Compounds

One particularly important agricultural utility of the novel polymer/humic acid compositions of the invention is the ability of the compositions to enhance the effectiveness of sulfur-bearing compounds such as gypsum, one or more members of the Kieserite Group, potassium magnesium sulfate, elemental sulfur, and mixtures thereof. The compositions may be applied as surface coatings as solid fertilizers, or may be added to solutionized liquid fertilizers as a liquid; this combined liquid material may then be sprayed on soils prior to planting. Moreover, the compositions liberate soluble calcium and soluble sulfur-containing species from gypsum and other minerals. Calcium sulfate exists in a wide range of forms, crystal structures, hydration levels, and particle morphologies, but the calcium sulfate content thereof has been difficult to exploit for plant nutrition purposes, owing to the poor solubility of the calcium and sulfur-containing species therein.

It has been found that the addition of comparatively small levels of the polymer/humic acid compositions of the invention applied to solid calcium sulfate or calcium sulfate-containing materials serves to increase the liberation of calcium and soluble sulfur species from calcium sulfate or similar materials. Generally, the compositions are used at a level of from about 0.01-10% w/w, more preferably from about 0.05-2% w/w, where the total weight of the composition/calcium sulfate or calcium sulfate-containing products is taken as 100% by weight. These effects are further enhanced by the inclusion of alpha-hydroxy carboxylic acid compounds with the polymer/humic acid compositions of the invention, which may be used singly or in mixtures of 2 or more acids. The most useful alpha-hydroxy acids are saturated and essentially free of double bonds and carbon ring structures, including both aliphatic and aromatic ring structures (i.e., no more than about 5 mole percent of double bonds or ring structures). Such alpha-hydroxy acids possess at least one carboxylic acid functional group and have at least one hydroxyl group on the carbon atom adjacent to the carboxylate group. Especially preferred acids of this character include lactic acid (D, L, or racemic mixtures are useful), glycolic acid, citric acid, tartaric acid, tartronic acid, glyceric acid, and dihydroxypropanedioic acid. The alpha-hydroxy acids may have more than one carboxylic acid functional group per molecule, more than one alphahydroxyl group, or any combination thereof.

The preferred polymer/humic acid/alpha-hydroxy acid formulations generally include from about 10-45% w/w, more preferably from about 15-35% w/w, of the polymer/humic acid compositions of the invention; from about 3-60% w/w, more preferably from about 10-40% w/w, of alpha-hydroxy carboxylic acid(s); and the balance being an inert solvent, preferably water. The foregoing ranges are based upon the total weight of the formulations taken as 100% by weight. The polymer/humic acid/alpha-hydroxy carboxylic acid formulations may be further improved with respect to coating uniformity and general performance by the addition of polyvinyl alcohols (PVA's) thereto. While essentially all PVA's are useful, preferred PVA's are of relatively low average molecular weight, such that a 4% w/w solution of the PVA's in water at 20° C. ranges between about 1-1000 centipoise. Very small amounts of PVA's may be used in a range of from about 0.1% w/w-10% w/w of the total formulation, and more preferably from about 0.05% w/w-2% w/w. It is also possible to use more than one molecular weight of PVA, but the PVA combinations advantageously are within the above viscosity ranges. Still further, preferred PVA's have high levels of hydrolysis, where at least 97 mole percent, and preferably at least about 98 mole percent, of the functional groups are hydrolyzed.

In normal use, the polymer/humic acid/alpha-hydroxy formulations, with or without the incorporation of PVA's, is applied to the surface of solid calcium sulfate and/or calcium sulfate materials, and allowed to dry thereon. Thus, in the final product, the dried residue of the initial polymer/alpha-hydroxy formulations are present on the surface of the dried calcium sulfate and/or calcium sulfate materials. Alternately, the polymer/humic acid/alpha-hydroxy compositions may be added to solutionized fertilizers. The polymer/humic acid/alpha-hydroxy formulations are normally used at a level of from about 0.01-10% by weight, more preferably from about 0.05-2%, based upon the total weight of the finished composite product taken as 100% by weight.

c. Specific Uses with Potassium-Containing Granular Fertilizers

Another significant agricultural utility of the polymer/humic acid compositions of the invention involves use with potassium-containing granular fertilizers in order to decrease fertilizer losses. That is, the compositions may be applied directly to granular potassium fertilizer, and especially potassium chloride-based fertilizers, at a level of from about 0.001-10% by weight, more preferably from about 0.004-2% by weight, based upon the total weight of the polymer/humic acid/potassium fertilizer material taken as 100% by weight. In order to form suitable coatings on these fertilizers without generation of significant amounts of hydrochloric acid, it is generally preferred that the polymers be neutralized with a suitable cation to a pH of from about 0.1-4, and more preferably from about 1-2.

Additionally, use of polymer/humic acid compositions in accordance with the present invention increases the availability of phosphorus and other common fertilizer ingredients and decreases nitrogen volatilization, thereby rendering ambient levels of such plant nutrient available for uptake by growing plants. In such cases, the compositions can be applied as a coating to fertilizer products prior to their introduction into the soil. In turn, plants grown in soil containing such polymers exhibit enhanced growth characteristics.

d. Uses as Seed Coatings

Another alternative use of polymer/humic acid compositions in accordance with the present invention includes using the compositions as seed coatings. In such cases, the polymer/humic acid compositions comprises at least about 0.001-10% by weight of the coated seed, more preferably from about 0.004-2% by weight of the coated seed. Use of the polymer/humic acid compositions as a seed coating provides polymer in close proximity to the seed when planted so that the composition can exert its beneficial effects in the environment where it is most needed. That is, the new compositions provide an environment conducive to enhanced plant growth in the area where the effects can be localized around the desired plant. In the case of seeds, the compositions provide an enhanced opportunity for seed germination, subsequent plant growth, and an increase in plant nutrient availability, which is provided by the polymer salts.

In preferred practice, the polymer fractions of the polymer/humic acid compositions have a relatively high metals content, and particularly micronutrient metals, such as Zn, Mn, B, Fe, Mo, and Cu, to provide sufficient micronutrients for optimum seed growth. Moreover, the compositions are desirably solutions relatively free of suspended or settled solids for reasons of homogeneity and cosmetic appearance, and should have a pH in the range of from about 5-7. In practice, the polymer/humic acid compositions are applied to the surfaces of seeds in any convenient fashion, and allowed to dry thereon, so that the finished seeds have the dried residue of the original liquid composition on the surfaces thereof.

e. Uses of the Polymers with Zinc Salt/Urea Compositions

Compositions comprising urea and zinc salts are known, particularly for the purpose of overcoming zinc deficiencies. See, e.g., U.S. Pat. Nos. 3,981,713 and 8,101,548. It has been found that the novel polymer/humic acid compositions of the invention can be used with such zinc salt/urea mixtures in order to minimize volatilization by inhibiting the action of ureases. In such contexts, the composition should have a pH of 6 or less, more preferably from about 2-4. Advantageously, the polymer/humic acid compositions are applied to granular urea, using the techniques and quantities described previously with respect to fertilizers generally. In preferred practice, the polymer/humic acid/zinc aqueous mixtures should be applied to the urea and allowed to dry so that the dried residue thereof remains on the fertilizer surfaces.

f. Uses in Reducing Atmospheric Ammonia

The novel polymer/humic acid compositions hereof may be used to treat livestock or poultry confinement facilities in order to reduce and mitigate the effects of gaseous ammonia within the facility. Generally, such facilities have a manure collection zone, upright walls forming an enclosure, and a roof substantially covering the zone. This utility involves applying a treatment material to the manure within the collection zone in an amount effective to lower the concentration of gaseous ammonia within the facility. Such material comprises an aqueous mixture of a polymer/humic acid composition in accordance with the present invention, and particularly when an amine, alkali metal or alkaline earth (e.g., calcium or ammonium) partial or saturated salt of the polymer is employed. Preferably, the treating mixture is applied directly into the collection zone (e.g., manure pit) below the enclosure. The treating material including the polymer/humic acid composition hereof should be applied at a level of from about 0.005-3 gallons per ton of manure, and more preferably from about 0.01-2.5 gallons per ton. The composition is preferably acidic having a pH of from about 1-5, and more preferably from about 2-4. The treating material is operable to reduce the amount of gaseous ammonia within the confinement zone by a level of at least 50% within 24 hours after application of the materials.

U.S. Patent Publication 2014/0041431 is incorporated by reference herein in its entirety. This publication describes techniques for reducing atmospheric ammonia through use of Class II polymers. These same techniques without alteration can be used with the Class I polymers of this invention, and also all different mixtures of Class I, Class IA, and Class II polymers.

It is sometimes useful to employ a plurality of different polymers in the treating compositions. For example, useful compositions may include from about 40-80% (more preferably 55-75%) by weight of a partial calcium salt of a polymer of the invention, and from about 20-60% (more preferably 25-45%) by weight of a partial ammonium salt of the same or a different polymer in accordance with the invention.

g. Uses as Animal Feed and/or Water Amendments

U.S. patent application Ser. No. 14/049,887, filed Oct. 9, 2013, discloses the use of Class I and/or Class II polymers as animal feed or water amendments serving to lower ammonia concentrations in the animal's excrement. That application is incorporated by reference herein in its entirety. The methods, animal feeds, and animal waters disclosed therein can be directly duplicated, without any alternations, in the context of the present invention where the polymer/humic acid compositions are used in lieu of the polymers disclosed therein. Thus, the types of polymers and salts used, the range of polymer/humic acid solids, and the amounts of water remain the same in the present invention. Likewise, the same specific methods of use may be employed in the context of the present invention.

2. Pesticide Adjuvants

The polymer/humic acid compositions of the invention can be used to enhance the effectiveness of a wide spectrum of pesticides. As used herein, "pesticide" refers to any agent with pesticidal activity (e.g., herbicides, insecticides, fungicides, and nematocides) and is preferably selected from the group consisting of insecticides, herbicides, and mixtures thereof. The well known pyrethroid and organophosphate pesticides are suitable for use in the invention, as well as glyphosate herbicides.

In some cases, the polymer/humic acid composition is blended with the pesticide to form a mixture which then can be applied to soil, in foliar applications, onto hard surfaces, as aerosols, as additives to liquid or solid compositions (e.g., manure), or in any other context where pesticidal activity is desired. Alternately, the pesticide and composition may be simultaneously or sequentially (typically within 24 hours of each other) applied to soil. Where mixed products are employed, they are typically in the form of aqueous dispersions, generally having water, pesticide, and polymer/humic acid fractions. Other minor ingredients may also be used in the products such as surfactants and pH adjustment agents, or any of the other aforementioned adjuvants or additives known in the art. Composites comprising a polymer/humic acid composition of the invention with glyphosate and micronutrients have also proven to be very effective, with minimal use of the micronutrients.

The amount of polymer/humic acid composition in the pesticide composites of the invention can vary over wide limits, and the principal consideration is one of polymer cost. Generally, the polymer/humic acid composition should be present at a level of from about 0.05-10% by weight (more preferably from about 0.1-4% by weight, and most preferably from about 0.2-2% by weight) based upon the total weight of the pesticide composite taken as 100% by weight.

The pesticides used in the composites of the invention are broadly selected from insecticides and herbicides. In the context of insecticides, synthetic pyrethroids and organophosphates are particularly preferred. For example, permethrin (C21H20Cl2O3, (3-phenoxyphenyl) methyl 3-(2,2-dichloroethenyl)-2,2-dimethyl-cyclopropane-1-carboxylate, CAS #52645-53-1) and bifenthrin (C23H22ClF3O2, (2-methyl-3-phenylphenyl) methyl (1S,3S)-3-[(Z)-2-chloro-3,3,3-trifluoroprop-1-enyl]-2,2-dimethylcyclopropane-1-carboxylate, CAS #82657-04-3) are suitable pyrethroids. A typical organophosphate pesticide useful in the invention is malathion (C10H19O6PS2, 2-(dimethoxyphosphinothioyl-thio) butanedioic acid diethyl ester, CAS #121-75-5).

More generally, the following insecticides are useful in the invention: antibiotic insecticides: allosamidin, thuringiensin macrocyclic lactone insecticides
    avermectin insecticides: abamectin, doramectin, emamectin, eprinomectin, ivermectin, selamectin
    milbemycin insecticides: lepimectin, ilbemectin, milbemycin oxime, moxidectin
    spinosyn insecticides: spinetoram, spinosad arsenical insecticides: calcium arsenate, copper acetoarsenite, copper arsenate, lead arsenate, potassium arsenite, sodium arsenite botanical insecticides: anabasine, azadirachtin, d-limonene, nicotine, pyrethrins (cinerins (cinerin I, cinerin II), jasmolin I, jasmolin II, pyrethrin I, pyrethrin II), quassia, rotenone, ryania, sabadilla carbamate insecticides: bendiocarb, carbaryl
    benzofuranyl methylcarbamate insecticides: benfuracarb, carbofuran, carbosulfan, decarbofuran, furathiocarb
    dimethylcarbamate insecticides: dimetan, dimetilan, hyquincarb, pirimicarb
    oxime carbamate insecticides: alanycarb, aldicarb, aldoxycarb, butocarboxim, butoxycarboxim, methomyl, nitrilacarb, oxamyl, tazimcarb, thiocarboxime, thiodicarb, thiofanox
    phenyl methylcarbamate insecticides: allyxycarb, aminocarb, bufencarb, butacarb, carbanolate, cloethocarb, dicresyl, dioxacarb, EMPC, ethiofencarb, fenethacarb, fenobucarb, isoprocarb, methiocarb, metolcarb, mexacarbate, promacyl, promecarb, propoxur, trimethacarb, XMC, xylylcarb desiccant insecticides: boric acid, diatomaceous earth, silica gel diamide insecticides: chlorantraniliprole, cyantraniliprole, flubendiamide dinitrophenol insecticides: dinex, dinoprop, dinosam, DNOC fluorine insecticides: barium hexafluorosilicate, cryolite, sodium fluoride, sodium hexafluorosilicate, sulfluramid formamidine insecticides: amitraz, chlordimeform, formetanate, formparanate fumigant insecticides: acrylonitrile, carbon disulfide, carbon tetrachloride, chloroform, chloropicrin, para-dichlorobenzene, 1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride, tetrachloroethane inorganic insecticides: borax, boric acid, calcium polysulfide, copper oleate, diatomaceous earth, mercurous chloride, potassium thiocyanate, silica gel, sodium thiocyanate, see also arsenical insecticides, see also fluorine insecticides insect growth regulators
    chitin synthesis inhibitors: bistrifluron, buprofezin, chlorfluazuron, cyromazine, diflubenzuron, flucycloxuron, flufenoxuron, hexaflumuron, lufenuron, novaluron, noviflumuron, penfluron, teflubenzuron, triflumuron
    juvenile hormone mimics: epofenonane, fenoxycarb, hydroprene, kinoprene, methoprene, pyriproxyfen, triprene
    juvenile hormones: juvenile hormone I, juvenile hormone II, juvenile hormone III
    moulting hormone agonists: chromafenozide, halofenozide, methoxyfenozide, tebufenozide
    moulting hormones: a-ecdysone, ecdysterone
    moulting inhibitors: diofenolan
    precocenes: precocene I, precocene II, precocene III
    unclassified insect growth regulators: dicyclanil nereistoxin analogue insecticides: bensultap, cartap, thiocyclam, thiosultap nicotinoid insecticides: flonicamid
    nitroguanidine insecticides: clothianidin, dinotefuran, imidacloprid, thiamethoxam
    nitromethylene insecticides: nitenpyram, nithiazine
    pyridylmethylamine insecticides: acetamiprid, imidacloprid, nitenpyram, thiacloprid organochlorine insecticides: bromo-DDT, camphechlor, DDT (pp'-DDT), ethyl-DDD, HCH (gamma-HCH, lindane), methoxychlor, pentachlorophenol, TDE
    cyclodiene insecticides: aldrin, bromocyclen, chlorbicyclen, chlordane, chlordecone, dieldrin, dilor, endosulfan (alpha-endosulfan), endrin, HEOD, heptachlor, HHDN, isobenzan, isodrin, kelevan, mirex organophosphorus insecticides
    organophosphate insecticides: bromfenvinfos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP, tetrachlorvinphos
    organothiophosphate insecticides: dioxabenzofos, fosmethilan, phenthoate
    aliphatic organothiophosphate insecticides: acethion, amiton, cadusafos, chlorethoxyfos, chlormephos, demephion (demephion-O, demephion-S), demeton (demeton-O, demeton-S), demeton-methyl (demeton-O-methyl, demeton-S-methyl), demeton-S-methylsulphon, disulfoton, ethion, ethoprophos, IPSP, isothioate, malathion, methacrifos, oxydemeton-methyl, oxydeprofos, oxydisulfoton, phorate, sulfotep, terbufos, thiometon
    aliphatic amide organothiophosphate insecticides: amidithion, cyanthoate, dimethoate, ethoate-methyl, formothion, mecarbam, omethoate, prothoate, sophamide, vamidothion
    oxime organothiophosphate insecticides: chlorphoxim, phoxim, phoxim-methyl
    heterocyclic organothiophosphate insecticides: azamethiphos, coumaphos, coumithoate, dioxathion, endothion, menazon, morphothion, phosalone, pyraclofos, pyridaphenthion, quinothion
    benzothiopyran organothiophosphate insecticides: dithicrofos, thicrofos
    benzotriazine organothiophosphate insecticides: azinphos-ethyl, azinphos-methyl
    isoindole organothiophosphate insecticides: dialifos, phosmet
    isoxazole organothiophosphate insecticides: isoxathion, zolaprofos
    pyrazolopyrimidine organothiophosphate insecticides: chlorprazophos, pyrazophos pyridine organothiophosphate insecticides: chlorpyrifos, chlorpyrifos-methyl
pyrimidine organothiophosphate insecticides: butathiofos, diazinon, etrimfos, lirimfos, pirimiphos-ethyl, pirimiphos-methyl, primidophos, pyrimitate, tebupirimfos
quinoxaline organothiophosphate insecticides: quinalphos, quinalphos-methyl
thiadiazole organothiophosphate insecticides: athidathion, lythidathion, methidathion, prothidathion
triazole organothiophosphate insecticides: isazofos, triazophos
phenyl organothiophosphate insecticides: azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3, trifenofos
phosphonate insecticides: butonate, trichlorfon
phosphonothioate insecticides: mecarphon
    phenyl ethylphosphonothioate insecticides: fonofos, trichloronat
    phenyl phenylphosphonothioate insecticides: cyanofenphos, EPN, leptophos
phosphoramidate insecticides: crufomate, fenamiphos, fosthietan, mephosfolan, phosfolan, pirimetaphos
phosphoramidothioate insecticides: acephate, isocarbophos, isofenphos, isofenphos-methyl, methamidophos, propetamphos
phosphorodiamide insecticides: dimefox, mazidox, mipafox, schradan
oxadiazine insecticides: indoxacarb
oxadiazolone insecticides: metoxadiazone
phthalimide insecticides: dialifos, phosmet, tetramethrin
pyrazole insecticides: chlorantraniliprole, cyantraniliprole, dimetilan, tebufenpyrad, tolfenpyrad
phenylpyrazole insecticides: acetoprole, ethiprole, fipronil, pyraclofos, pyrafluprole, pyriprole, vaniliprole
pyrethroid insecticides
pyrethroid ester insecticides: acrinathrin, allethrin (bioallethrin), barthrin, bifenthrin, bioethanomethrin, cyclethrin, cycloprothrin, cyfluthrin (beta-cyfluthrin), cyhalothrin, (gamma-cyhalothrin, lambda-cyhalothrin), cypermethrin (alpha-cypermethrin, beta-cypermethrin, theta-cypermethrin, zeta-cypermethrin), cyphenothrin, deltamethrin, dimefluthrin, dimethrin, empenthrin, fenfluthrin, fenpirithrin, fenpropathrin, fenvalerate (esfenvalerate), flucythrinate, fluvalinate (tau-fluvalinate), furethrin, imiprothrin, metofluthrin, permethrin (biopermethrin, transpermethrin), phenothrin, prallethrin, profluthrin, pyresmethrin, resmethrin (bioresmethrin, cismethrin), tefluthrin, terallethrin, tetramethrin, tralomethrin, transfluthrin
pyrethroid ether insecticides: etofenprox, flufenprox, halfenprox, protrifenbute, silafluofen
pyrimidinamine insecticides: flufenerim, pyrimidifen
pyrrole insecticides: chlorfenapyr
tetramic acid insecticides: spirotetramat
tetronic acid insecticides: spiromesifen
thiazole insecticides: clothianidin, thiamethoxam
thiazolidine insecticides: tazimcarb, thiacloprid
thiourea insecticides: diafenthiuron
urea insecticides: flucofuron, sulcofuron, see also chitin synthesis inhibitors
unclassified insecticides: closantel, copper naphthenate, crotamiton, EXD, fenazaflor, fenoxacrim, hydramethylnon, isoprothiolane, malonoben, metaflumizone, nifluridide, plifenate, pyridaben, pyridalyl, pyrifluquinazon, rafoxanide, sulfoxaflor, triarathene, triazamate.

The foregoing insecticides, and links for a further identification and description of the insecticides, can be found at http://www.alanwood.net/pesticides/class_insecticides.html, which is incorporated herein in its entirety.

A particularly preferred herbicide is glyphosate (C3H8NO5P, [(phosphonomethyl) amino] acetic acid, CAS #1071-83-6). Other herbicides which can be used in the invention include:
amide herbicides: allidochlor, amicarbazone, beflubutamid, benzadox, benzipram, bromobutide, cafenstrole, CDEA, cyprazole, dimethenamid (dimethenamid-P), diphenamid, epronaz, etnipromid, fentrazamide, flucarbazone, flupoxam, fomesafen, halosafen, isocarbamid, isoxaben, napropamide, naptalam, pethoxamid, propyzamide, quinonamid, saflufenacil, tebutam
    anilide herbicides: chloranocryl, cisanilide, clomeprop, cypromid, diflufenican, etobenzanid, fenasulam, flufenacet, flufenican, ipfencarbazone, mefenacet, mefluidide, metamifop, monalide, naproanilide, pentanochlor, picolinafen, propanil, sulfentrazone
    arylalanine herbicides: benzoylprop, flamprop (flamprop-M),
    chloroacetanilide herbicides: acetochlor, alachlor, butachlor, butenachlor, delachlor, diethatyl, dimethachlor, metazachlor, metolachlor (S-metolachlor), pretilachlor, propachlor, propisochlor, prynachlor, terbuchlor, thenylchlor, xylachlor
    sulfonanilide herbicides: benzofluor, cloransulam, diclosulam, florasulam, flumetsulam, metosulam, perfluidone, pyrimisulfan, profluazol
    sulfonamide herbicides: asulam, carbasulam, fenasulam, oryzalin, penoxsulam, pyroxsulam, see also sulfonylurea herbicides
    thioamide herbicides: bencarbazone, chlorthiamid
antibiotic herbicides: bilanafos
aromatic acid herbicides:
    benzoic acid herbicides: chloramben, dicamba, 2,3,6-TBA, tricamba
    pyrimidinyloxybenzoic acid herbicides: bispyribac, pyriminobac
    pyrimidinylthiobenzoic acid herbicides: pyrithiobac
    phthalic acid herbicides: chlorthal
    picolinic acid herbicides: aminopyralid, clopyralid, picloram
    quinolinecarboxylic acid herbicides: quinclorac, quinmerac
arsenical herbicides: cacodylic acid, CMA, DSMA, hexaflurate, MAA, MAMA, MSMA, potassium arsenite, sodium arsenite
benzoylcyclohexanedione herbicides: mesotrione, sulcotrione, tefuryltrione, tembotrione
benzofuranyl alkylsulfonate herbicides: benfuresate, ethofumesate
benzothiazole herbicides: benazolin, benzthiazuron, fenthiaprop, mefenacet, methabenzthiazuron
carbamate herbicides: asulam, carboxazole, chlorprocarb, dichlormate, fenasulam, karbutilate, terbucarb
carbanilate herbicides: barban, BCPC, carbasulam, carbetamide, CEPC, chlorbufam, chlorpropham, CPPC, desmedipham, phenisopham, phenmedipham, phenmediphamethyl, propham, swep cyclohexene oxime herbicides: alloxydim, butroxydim, clethodim, cloproxydim, cycloxydim, profoxydim, sethoxydim, tepraloxydim, tralkoxydim
cyclopropylisoxazole herbicides: isoxachlortole, isoxaflutole
dicarboximide herbicides: cinidon-ethyl, flumezin, flumiclorac, flumioxazin, flumipropyn, see also uracil herbicides
dinitroaniline herbicides: benfluralin, butralin, dinitramine, ethalfluralin, fluchloralin, isopropalin, methalpropalin, nitralin, oryzalin, pendimethalin, prodiamine, profluralin, trifluralin
dinitrophenol herbicides: dinofenate, dinoprop, dinosam, dinoseb, dinoterb, DNOC, etinofen, medinoterb
diphenyl ether herbicides: ethoxyfen
    nitrophenyl ether herbicides: acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen, oxyfluorfen
dithiocarbamate herbicides: dazomet, metam
halogenated aliphatic herbicides: alorac, chloropon, dalapon, flupropanate, hexachloroacetone, iodomethane, methyl bromide, monochloroacetic acid, SMA, TCA
imidazolinone herbicides: imazamethabenz, imazamox, imazapic, imazapyr, imazaquin, imazethapyr
inorganic herbicides: ammonium sulfamate, borax, calcium chlorate, copper sulfate, ferrous sulfate, potassium azide, potassium cyanate, sodium azide, sodium chlorate, sulfuric acid
nitrile herbicides: bromobonil, bromoxynil, chloroxynil, dichlobenil, iodobonil, ioxynil, pyraclonil
organophosphorus herbicides: amiprofos-methyl, anilofos, bensulide, bilanafos, butamifos, 2,4-DEP, DMPA, EBEP, fosamine, glufosinate (glufosinate-P), glyphosate, piperophos
oxadiazolone herbicides: dimefuron, methazole, oxadiargyl, oxadiazon
oxazole herbicides: carboxazole, fenoxasulfone, isouron, isoxaben, isoxachlortole, isoxaflutole, monisouron, pyroxasulfone, topramezone
phenoxy herbicides: bromofenoxim, clomeprop, 2,4-DEB, 2,4-DEP, difenopenten, disul, erbon, etnipromid, fenteracol, trifopsime
    phenoxyacetic herbicides: 4-CPA, 2,4-D, 3,4-DA, MCPA, MCPA-thioethyl, 2,4,5-T
    phenoxybutyric herbicides: 4-CPB, 2,4-DB, 3,4-DB, MCPB, 2,4,5-TB
    phenoxypropionic herbicides: cloprop, 4-CPP, dichlorprop (dichlorprop-P), 3,4-DP, fenoprop, mecoprop, (mecoprop-P)
    aryloxyphenoxypropionic herbicides: chlorazifop, clodinafop, clofop, cyhalofop, diclofop, fenoxaprop, (fenoxaprop-P), fenthiaprop, fluazifop, (fluazifop-P), haloxyfop, (haloxyfop-P), isoxapyrifop, metamifop, propaquizafop, quizalofop, (quizalofop-P), trifop
phenylenediamine herbicides: dinitramine, prodiamine
pyrazole herbicides: azimsulfuron, difenzoquat, halosulfuron, metazachlor, metazosulfuron, pyrazosulfuron, pyroxasulfone
    benzoylpyrazole herbicides: benzofenap, pyrasulfotole, pyrazolynate, pyrazoxyfen, topramezone
    phenylpyrazole herbicides: fluazolate, nipyraclofen, pinoxaden, pyraflufen
pyridazine herbicides: credazine, pyridafol, pyridate
pyridazinone herbicides: brompyrazon, chloridazon, dimidazon, flufenpyr, metflurazon, norflurazon, oxapyrazon, pydanon
pyridine herbicides: aminopyralid, cliodinate, clopyralid, diflufenican, dithiopyr, flufenican, fluroxypyr, haloxydine, picloram, picolinafen, pyriclor, pyroxsulam, thiazopyr, triclopyr
pyrimidinediamine herbicides: iprymidam, tioclorim
quaternary ammonium herbicides: cyperquat, diethamquat, difenzoquat, diquat, morfamquat, paraquat
thiocarbamate herbicides: butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate, vernolate
thiocarbonate herbicides: dimexano, EXD, proxan
thiourea herbicides: methiuron
triazine herbicides: dipropetryn, indaziflam, triaziflam, trihydroxytriazine
    chlorotriazine herbicides: atrazine, chlorazine, cyanazine, cyprazine, eglinazine, ipazine, mesoprazine, procyazine, proglinazine, propazine, sebuthylazine, simazine, terbuthylazine, trietazine
    methoxytriazine herbicides: atraton, methometon, prometon, secbumeton, simeton, terbumeton
    methylthiotriazine herbicides: ametryn, aziprotryne, cyanatryn, desmetryn, dimethametryn, methoprotryne, prometryn, simetryn, terbutryn
triazinone herbicides: ametridione, amibuzin, hexazinone, isomethiozin, metamitron, metribuzin
triazole herbicides: amitrole, cafenstrole, epronaz, flupoxam
triazolone herbicides: amicarbazone, bencarbazone, carfentrazone, flucarbazone, ipfencarbazone, propoxycarbazone, sulfentrazone, thiencarbazone
triazolopyrimidine herbicides: cloransulam, diclosulam, florasulam, flumetsulam, metosulam, penoxsulam, pyroxsulam
uracil herbicides: benzfendizone, bromacil, butafenacil, flupropacil, isocil, lenacil, saflufenacil, terbacil
urea herbicides: benzthiazuron, cumyluron, cycluron, dichloralurea, diflufenzopyr, isonoruron, isouron, methabenzthiazuron, monisouron, noruron
    phenylurea herbicides: anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron, thidiazuron
    sulfonylurea herbicides:
        pyrimidinylsulfonylurea herbicides: amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron
        triazinylsulfonylurea herbicides: chlorsulfuron, cinosulfuron, ethametsulfuron, iodosulfuron, metsulfuron, prosulfuron, thifensulfuron, triasulfuron, tribenuron, triflusulfuron, tritosulfuron
        thiadiazolylurea herbicides: buthiuron, ethidimuron, tebuthiuron, thiazafluron, thidiazuron
unclassified herbicides: acrolein, allyl alcohol, aminocyclopyrachlor, azafenidin, bentazone, benzobicyclon, bicyclopyrone, buthidazole, calcium cyanamide, cambendichlor, chlorfenac, chlorfenprop, chlorflurazole, chlorflurenol, cinmethylin, clomazone, CPMF, cresol, cyanamide, ortho-dichlorobenzene, dimepiperate, endothal, fluoromidine, fluridone, flurochloridone, flurtamone, fluthiacet, indanofan, methyl isothiocyanate, OCH, oxaziclomefone, pentachlorophenol, pentoxazone, phenylmercury acetate, prosulfalin, pyribenzoxim, pyriftalid, quinoclamine, rhodethanil, sulglycapin, thidiazimin, tridiphane, trimeturon, tripropindan, tritac.

The foregoing herbicides, and links for a further identification and description of the herbicides, can be found at http://www.alanwood.net/pesticides/class_herbicides.html, which is incorporated herein in its entirety.

In many instances, pesticides having an amphoteric or positive surface charge are preferred. Such surface charge characteristics may be inherent in the pesticide employed, or may arise by applying an appropriate cationic or amphoteric surfactant onto the surfaces of pesticide particles. Generally, the surfactants are used at a level of from about 0.01-10% by weight (more preferably from about 0.1-3% by weight) based upon the total weight of the pesticide fraction in the overall composition taken as 100% by weight.

Suitable cationic surfactants include: dieicosyldimethyl ammonium chloride; didocosyldimethyl ammonium chloride; dioctadecyidimethyl ammonium chloride; dioctadecyldimethyl ammonium methosulphate; ditetradecyldimethyl ammonium chloride and naturally occurring mixtures of above fatty groups, e.g., di(hydrogenated tallow)dimethyl ammonium chloride; di(hydrogenated tallow)dimethyl ammonium metho-sulphate; ditallow dimethyl ammonium chloride; and dioleyidimethyl ammonium chloride.

These cationic surfactants also include imidazolinium compounds, for example, 1-methyl-1-(tallowylamido-)ethyl-2-tallowyl4,5-dihydroimidaz-olinium methosulphate and 1-methyl-1-(palmitoylamido)ethyl-2-octadecyl 4,5-dihydro-imidazolinium methosulphate. Other useful imidazolinium materials are 2-heptadecyl-1-methyl-1(2-stearoylamido)-ethyl-imidazoliniu-m methosulphate and 2-lauryl-lhydroxyethyl-1-oleyl-imidazolinium chloride.

Further examples of suitable cationic surfactants include: dialkyl(C12-C22)dimethylammonium chloride; alkyl(coconut)dimethylbenzylammonium chloride; octadecylamine acetate salt; tetradecylamine acetate salt; tallow alkylpropylenediamine acetate salt; octadecyltrimethylammonium chloride; alkyl(tallow)trimethylammonium chloride; dodecyltrimethylammonium chlorid; alkyl(coconut)trimethylammonium chloride; hexadecyltrimethylammonium chloride; biphenyltrimethylammonium chloride, alkyl(tallow) imidazoline quaternary salt; tetradecylmethylbenzylammonium chloride; octadecyidimethylbenzylammonium chloride; dioleyidimethylammonium chloride; polyoxyethylene dodecylmonomethylammonium chloride; polyoxyethylene alkyl(C12-C22) benzylammonium chloride; polyoxyethylene laurylmonomethyl ammonium chloride; 1-hydroxyethyl-2-alkyl(tallow)-imidazoline quaternary salt; and a silicone cationic surfactant having a siloxane group as a hydrophobic group, a fluorine-containing cationic surfactant having a fluoroalkyl group as a hydrophobic group.

Amphoteric (Zwitterionic) surfactants have a positive, negative, or both charges on the hydrophilic part of the molecule in acidic or alkaline media. Any suitable amphoteric surfactant may be used. For example, aminoproprionates may be employed where the alkyl chain of the aminopropionate is preferably between about C.4 and about C.12 and may be branched or linear. The aminoproprionate may also be a sodium alkyl aminoproprionate. One representative commercially available product is sold under the trade name MIRATAINE JC-HA.

Other suitable amphoteric surfactants include, diproprionates such as Mirataine H2C-HA, sultaines such as Mirataine ASC, betaines such as Mirataine BET-O-30, amine oxides such as Barlox 12i and amphoteric imidazoline derivatives in the acetate form, Miranol JEM Conc, diprorionate form, Miranol C2M-SF Conc.), and sulfonates such as Miranol JS Conc.

Other examples of amphoteric surfactants include amino acid, betaine, sultaine, sulfobetaines, carboxylates and sulfonates of fatty acids, phosphobetaines, imidazolinium derivatives, soybean phospholipids, yolk lecithin, the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates and alkyl amphopropionates wherein alkyl represents an alkyl group having 6 to carbon atoms, alkyliminopropionates, alkyl iminodipropionates and alkyl amphopropylsulfonates having between 12 and 18 carbon atoms, alkylbetaines and amidopropylbetaines and alkylsultaines and alkylamidopropylhydroxy sultaines wherein alkyl represents an alkyl group having 6 to 20 carbon atoms.

3. Nitrification/Urease Inhibition

The polymer/humic acid compositions of the invention have also been found to serve as inhibitors for the nitrification processes within soil, and to also inhibit urease activity therein. In this fashion, increased crop yields are realized owing to the fact that naturally occurring and fertilizer-supplied nitrogen sources are more efficiently utilized by plants. Most conveniently, the polymer/humic acid compositions of the invention are used with fluid (e.g., gaseous or liquid) or solid fertilizers containing ammoniacal nitrogen.

As used herein, "ammoniacal nitrogen" is a broad term embracing fertilizer compositions containing ammoniacal nitrogen ($NH_4$) as well as fertilizer compositions and other compounds which are precursors of ammoniacal nitrogen or that cause ammoniacal nitrogen to be generated when the fertilizers or compounds undergo various reactions such as hydrolysis. To give but one example, the polymers of the invention may be applied to or mixed with urea or other nitrogen-containing fertilizers which have no ammoniacal nitrogen therein as such. Nonetheless, such fertilizers will undergo reactions in the soil to generate ammoniacal nitrogen in situ. Thus, in this example urea or other precursor nitrogen-containing fertilizers would be deemed to contain ammoniacal nitrogen.

When the polymer/humic acid compositions are used in the form of aqueous dispersions in intimate contact with or dispersed in ammoniacal nitrogen fertilizers, the mixture is typically applied to soil adjacent growing plants or pre-applied to soils subject to nitrification. Aqueous polymer/humic acid compositions are typically used with liquid fertilizers at relatively low levels up to about 2% by volume (e.g., 0.01-2% by volume) based upon the total volume of the liquid fertilizer material taken as 100% by volume. In such uses, it is also preferred that the pH levels should be up to about 3, more preferably up to about 2, and most preferably up to about 1. Moreover, such aqueous dispersions advantageously contain from about 10-85% by weight solids, more preferably from about 40-65% by weight solids, and most preferably about 50% by weight solids.

In preparing the polymer/humic acid/liquid fertilizer composites of the invention, the ammoniacal nitrogen-containing fertilizer material(s) are suspended in water and the aqueous polymer mixture(s) are added thereto with mixing. No particular mixing regime or temperature conditions are required. Surprisingly, it has been found that these liquid fertilizer materials are quite stable and resist settling out or precipitation of solids over extended storage periods of at least about two weeks.

In the case of solid ammoniacal fertilizers, the polymer/humic acid compositions are directly applied to the fertilizer, typically at a level of from about 0.01-10% by weight, more preferably from about 0.05-2% by weight, based upon the total weight of the polymer/fertilizer product taken as 100% by weight.

EXAMPLE

In this example, the effects of anionic polymer/humic acid materials on starter liquid phosphate fertilizer was studied. Generally, in this laboratory experiment, corn was planted in soil and evaluated for phosphorous uptake. The soil was a mixture of 50% calcined clay and 50% heavy clay with a pH of 6.2. The fertilizer was a conventional 6-24-6 liquid phosphate fertilizer, which was applied in-furrow with the seed at an equivalent rate of 5 gallons per acre. In each test, eight seeds were planted and allowed to germinate and grow. The four smallest plants were discarded, and the remaining four plants cut off at about 1 cm above soil level for testing. The dry weights of the four corn plants were determined at week four (28 days after planting).

The anionic polymer used in these tests was a commercially available product, AVAIL® for liquid phosphate fertilizers, which is an approximately 40% by weight water dispersion of a partial ammonium salt of maleic-itaconic copolymer having a pH of about 2. The humic acid material was a commercially available product Humic 20, an aqueous mixture containing about 20% by weight humic acids and particularly potassium humates.

The following treatments were tested:
Treatment 1: No starter fertilizer or polymer/humic acid additive.
Treatment 2: Starter fertilizer only applied at a 5 gal/acre equivalent rate.
Treatment 3: AVAIL® only at 50% of the recommended application rate.
Treatment 4: AVAIL® only at 100% of the recommended application rate.
Treatment 5: 0.50% v/v Humic 20 at 20% of the recommended application rate.
Treatment 6: 2.5% v/v Humic 20 at 100% of the lowest recommended application rate.
Treatment 7: 5.0% v/v Humic 20 at an equivalent rate of 1 qt/acre, the most common application rate.
Treatment 8: AVAIL® at 50% of the recommended application rate+0.50% v/v Humic 20.
Treatment 9: AVAIL® at 50% of the recommended application rate+2.5% v/v Humic 20.
Treatment 10: AVAIL® at 50% of the recommended application rate+5% v/v Humic 20.
Treatment 11: AVAIL® at 100% of the recommended application rate+0.50% v/v Humic 20.
Treatment 12: AVAIL® at 100% of the recommended application rate+2.5% v/v Humic 20.
Treatment 13: AVAIL® at 100% of the recommended application rate+5% v/v Humic 20.

The following table sets forth the results of these tests, in terms of dry weight and average weight per plant.

| Treatment No. | Dry Weight (g) | Avg Wt/Plant (g) |
|---|---|---|
| 1 | 9.089 | 2.27 |
| 2 | 10.55 | 2.64 |
| 3 | 10.83 | 2.71 |
| 4 | 10.60 | 2.65 |
| 5 | 10.18 | 2.54 |
| 6 | 11.11 | 2.78 |
| 7 | 9.993 | 2.50 |
| 8 | 10.19 | 2.55 |
| 9 | 11.14 | 2.79 |
| 10 | 10.77 | 2.69 |
| 11 | 11.43 | 2.86 |
| 12 | 11.72 | 2.93 |
| 13 | 11.09 | 2.77 |

As is evident from the foregoing data, the combination of humic acid plus the AVAIL® product gave superior, or at least substantially equivalent, dry weight and weight per plant, as compared with the AVAIL®-only tests. When it is considered that the AVAIL® product is a premium, relatively high-cost material, while humic acid is comparatively very inexpensive, the economic value of the invention is manifest. That is, significant portions of the AVAIL® product may be eliminated with the addition of humic acid, thereby providing a significantly cheaper cost to growers for substantially equivalent results.

I claim:

1. An aqueous composition prepared prior to use in agriculture, said composition comprising respective amounts of humic acid and a polyanionic polymer, said polymer including maleic and itaconic repeat units, said aqueous composition consisting essentially of said humic acid and said polyanionic polymer.

2. The composition of claim 1, said polymer being a partially or fully saturated calcium salt.

3. The composition of claim 1, said composition comprising a plurality of polyanionic polymers.

4. The composition of claim 1, said humic acid being a mixture of humic acids.

5. The composition of claim 1, the weight ratio of polyanionic polymer to humic acid being from about 1:1 to 1:5.

6. The composition of claim 1, said polyanionic polymer being in the form of an aqueous dispersion, said humic acid also being in the form of an aqueous dispersion, the volumetric ratio of said polymer dispersion to said humic acid dispersion being from about 1:2 to 1:8.

7. The composition of claim 1, said polyanionic polymer being a tetrapolymer and having at least one maleic, itaconic, and sulfonate repeat unit therein.

8. The composition of claim 7, said polymer being in partial calcium salt form.

9. The composition of claim 7, said polyanionic polymer including a different polyanionic polymer having maleic and itaconic repeat units therein.

10. A method of treating soil comprising the step of applying to soil a composition in accordance with claim 1.

11. A method of treating soil comprising the step of applying to soil a composition according to claim 7.

12. A composite comprising a composition in accordance with claim 1 mixed with a fertilizer.

13. The composite of claim 12, said fertilizer being a solid fertilizer, said composition being applied to the surfaces of said fertilizer.

14. The composite of claim 12, said fertilizer being a liquid fertilizer, said composition mixed with said liquid fertilizer.

15. The composite of claim 12, said fertilizer comprising urea, said composite further including a zinc salt.

16. A method of fertilizing comprising the step of applying the composite of claim 12 to plants, the leaves of plants, the soil adjacent plants, or plant seeds.

17. A seed product comprising a seed coated with the composition of claim 1.

18. The composition of claim 6, wherein said composition has a pH of up to about 2.

19. An aqueous composition, said composition comprising respective amounts of humic acid and a polyanionic polymer, said polymer including maleic and itaconic repeat units, wherein said composition does not comprise soil.

\* \* \* \* \*